United States Patent
Greenwald et al.

(10) Patent No.: US 10,642,844 B2
(45) Date of Patent: May 5, 2020

(54) NON-MATERIALIZED TABLES WITH STANDING QUERIES

(71) Applicant: Arista Networks, Inc., Santa Clara, CA (US)

(72) Inventors: Michael Greenwald, Berkeley, CA (US); Stephen Schleimer, Campbell, CA (US)

(73) Assignee: Arista Networks, Inc., Santa Clara, CA (US)

( * ) Notice: Subject to any disclaimer, the term of this patent is extended or adjusted under 35 U.S.C. 154(b) by 374 days.

(21) Appl. No.: 15/473,932

(22) Filed: Mar. 30, 2017

(65) Prior Publication Data

US 2017/0286500 A1    Oct. 5, 2017

Related U.S. Application Data

(60) Provisional application No. 62/317,312, filed on Apr. 1, 2016.

(51) Int. Cl.
*G06F 7/00* (2006.01)
*G06F 16/00* (2019.01)
*G06F 16/2455* (2019.01)

(52) U.S. Cl.
CPC .............. *G06F 16/24568* (2019.01)

(58) Field of Classification Search
None
See application file for complete search history.

(56) References Cited

U.S. PATENT DOCUMENTS

| | | |
|---|---|---|
| 5,327,556 A | 7/1994 | Mohan et al. |
| 6,366,915 B1 | 4/2002 | Rubert et al. |
| 6,487,560 B1 | 11/2002 | LaRue et al. |
| 6,502,093 B1 | 12/2002 | Soylemez et al. |
| 6,732,124 B1 | 5/2004 | Koseki et al. |
| 6,834,276 B1 | 12/2004 | Jensen et al. |
| 6,910,070 B1 | 6/2005 | Mishra et al. |
| 7,177,859 B2 | 2/2007 | Pather et al. |
| 7,360,202 B1 | 4/2008 | Seshadri et al. |
| 7,590,666 B2 | 9/2009 | Korman et al. |
| 7,698,276 B2 * | 4/2010 | Seshadri ............. G06F 16/9535 719/318 |
| 8,150,959 B1 | 4/2012 | Bezdicek et al. |
| 8,631,034 B1 | 1/2014 | Peloski |
| 8,914,404 B1 | 12/2014 | Kim et al. |
| 9,009,289 B1 | 4/2015 | Jacob |
| 9,032,017 B1 | 5/2015 | Singh |

(Continued)

OTHER PUBLICATIONS

Allan et al.; Record Architecture for a Relational Database Management System Supporting Null Values and Extensible Tables; IP.com; 2005.

(Continued)

*Primary Examiner* — Tuan A Pham
(74) *Attorney, Agent, or Firm* — Chamberlain, Hrdlicka, White, Williams & Aughtry

(57) ABSTRACT

A network device includes a database that includes a materialized table and a non-materialized table. The network device also includes a standing query instance that generates an output that is stored in the non-materialized table. The database obtains a request that specifies the output, and provides the output in response to the request.

17 Claims, 23 Drawing Sheets

(56) References Cited

U.S. PATENT DOCUMENTS

| | | |
|---|---|---|
| 9,208,032 B1 | 12/2015 | McAlister |
| 9,529,682 B2 | 12/2016 | McAlister |
| 10,042,674 B2 | 8/2018 | Brown et al. |
| 10,331,634 B2 | 6/2019 | Hu |
| 2002/0004736 A1 | 1/2002 | Roundtree et al. |
| 2002/0007363 A1 | 1/2002 | Vaitzblit |
| 2003/0018644 A1 | 1/2003 | Bala et al. |
| 2004/0098425 A1 | 5/2004 | Wiss et al. |
| 2004/0205048 A1 | 10/2004 | Pizzo |
| 2005/0165731 A1 | 7/2005 | Funk |
| 2007/0050392 A1 | 3/2007 | Shukla et al. |
| 2007/0266331 A1 | 11/2007 | Bicker et al. |
| 2008/0104008 A1 | 5/2008 | Brantley et al. |
| 2008/0162849 A1 | 7/2008 | Savagaonkar et al. |
| 2008/0165943 A1 | 7/2008 | Gonzalez Lopez et al. |
| 2008/0208672 A1 | 8/2008 | Van Riel et al. |
| 2008/0208806 A1 | 8/2008 | Dalfo et al. |
| 2008/0300706 A1 | 12/2008 | Ruml et al. |
| 2009/0024752 A1 | 1/2009 | Shitomi |
| 2009/0063381 A1 | 3/2009 | Chan et al. |
| 2009/0234680 A1 | 9/2009 | Newton |
| 2009/0300528 A1 | 12/2009 | Stambaugh |
| 2010/0161555 A1 | 6/2010 | Nica et al. |
| 2010/0281102 A1 | 11/2010 | Chinta |
| 2011/0055231 A1 | 3/2011 | Huck et al. |
| 2011/0214050 A1 | 9/2011 | Stambaugh |
| 2011/0314047 A1 | 12/2011 | Koronthaly et al. |
| 2011/0320620 A1 | 12/2011 | Cutler et al. |
| 2012/0005220 A1 | 1/2012 | Schindlauer et al. |
| 2012/0023077 A1* | 1/2012 | Kann ................. G06F 16/275 707/702 |
| 2012/0112893 A1 | 5/2012 | Bezdicek et al. |
| 2012/0190325 A1 | 7/2012 | Abu-Hakima |
| 2012/0310906 A1 | 12/2012 | Miller et al. |
| 2013/0041781 A1 | 2/2013 | Freydberg |
| 2013/0150007 A1 | 6/2013 | Wang et al. |
| 2013/0188515 A1 | 7/2013 | Pinheiro et al. |
| 2014/0095535 A1 | 4/2014 | Deshmukh |
| 2014/0229221 A1 | 8/2014 | Shis |
| 2014/0310258 A1 | 10/2014 | Tian |
| 2014/0317084 A1 | 10/2014 | Chaudhry et al. |
| 2015/0009818 A1 | 1/2015 | Xiao et al. |
| 2015/0019701 A1 | 1/2015 | Marvin et al. |
| 2015/0149631 A1 | 5/2015 | Lissack |
| 2015/0193477 A1 | 7/2015 | Dunnant |
| 2015/0207794 A1 | 7/2015 | Lee et al. |
| 2015/0302149 A1 | 10/2015 | Whtsitt |
| 2015/0317399 A1 | 11/2015 | Akselrod et al. |
| 2016/0098450 A1 | 4/2016 | Tandon et al. |
| 2016/0283545 A1* | 9/2016 | Benke ................. G06F 16/215 |
| 2016/0308940 A1 | 10/2016 | Procopio et al. |
| 2017/0063948 A1 | 3/2017 | Shroff et al. |
| 2017/0177697 A1 | 6/2017 | Lee |
| 2017/0213257 A1 | 7/2017 | Murugesan et al. |
| 2019/0258613 A1 | 8/2019 | Hu |

OTHER PUBLICATIONS

IEEE 100—The Authoritative Dictionary of IEEE Standard Terms; Published by Standards Information Network, IEEE Press; 7th Edition; pp, 1133-1134; 2000.

What is a Database Schema? Published by Database Guide Jun. 6, 2016.

* cited by examiner

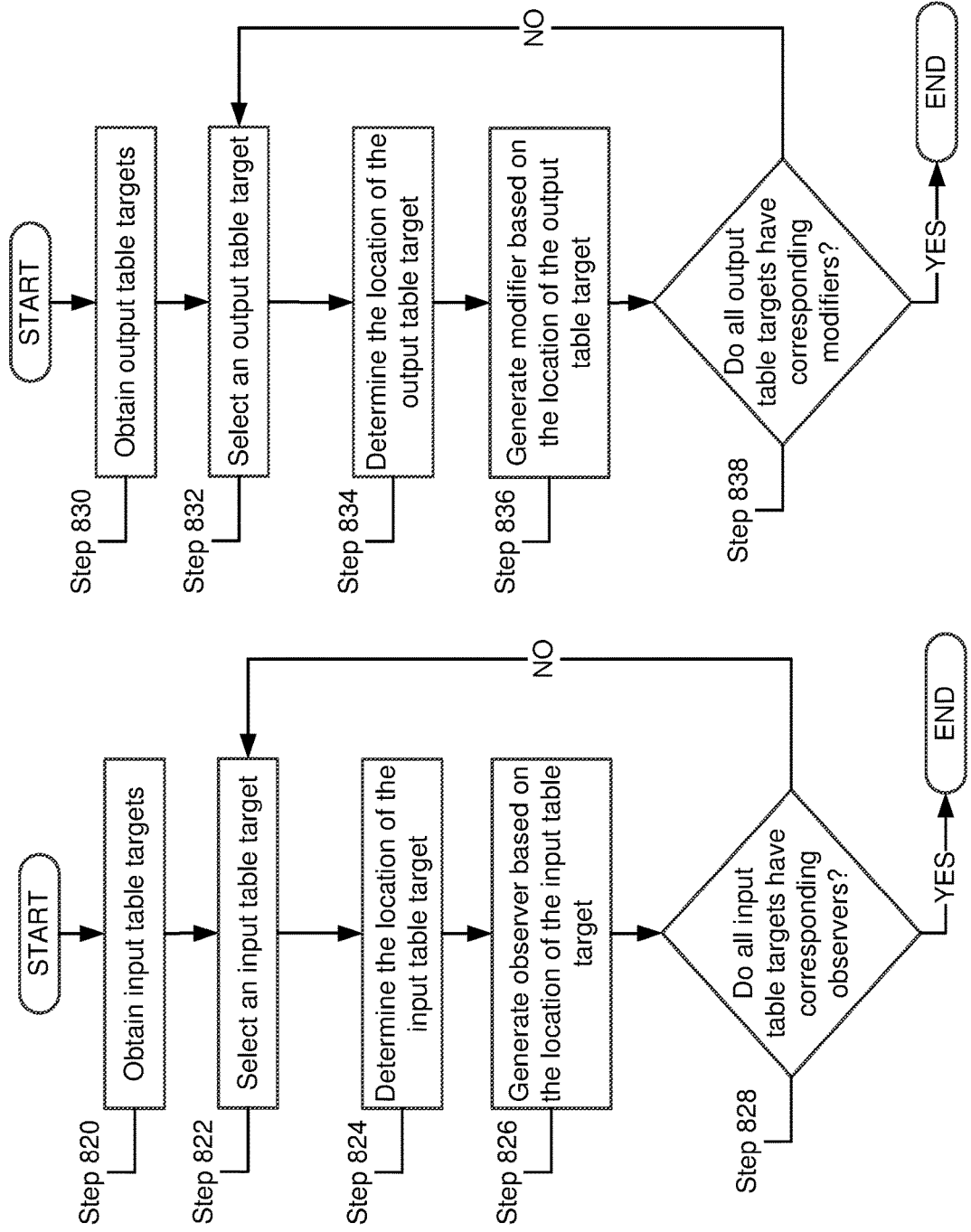

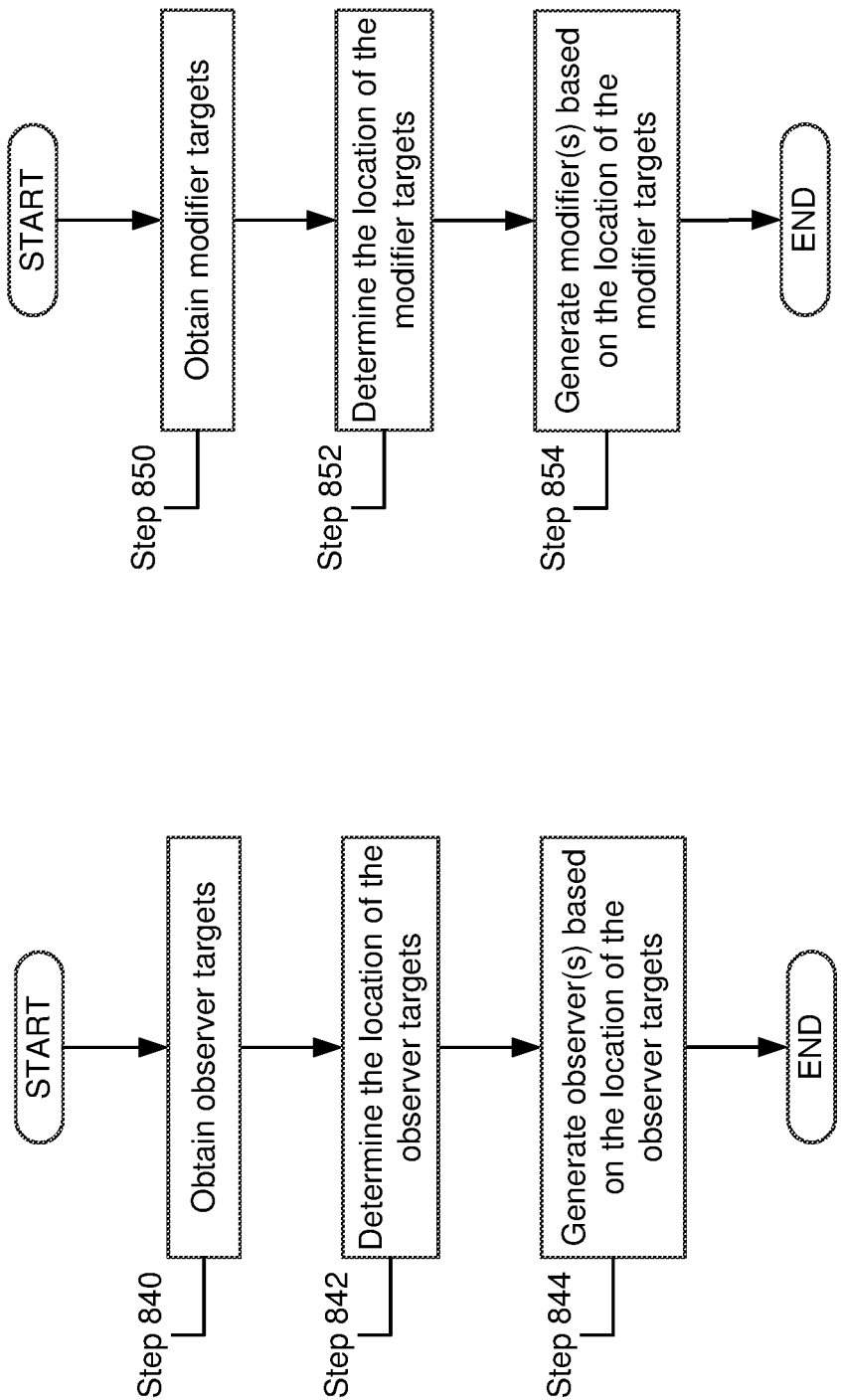

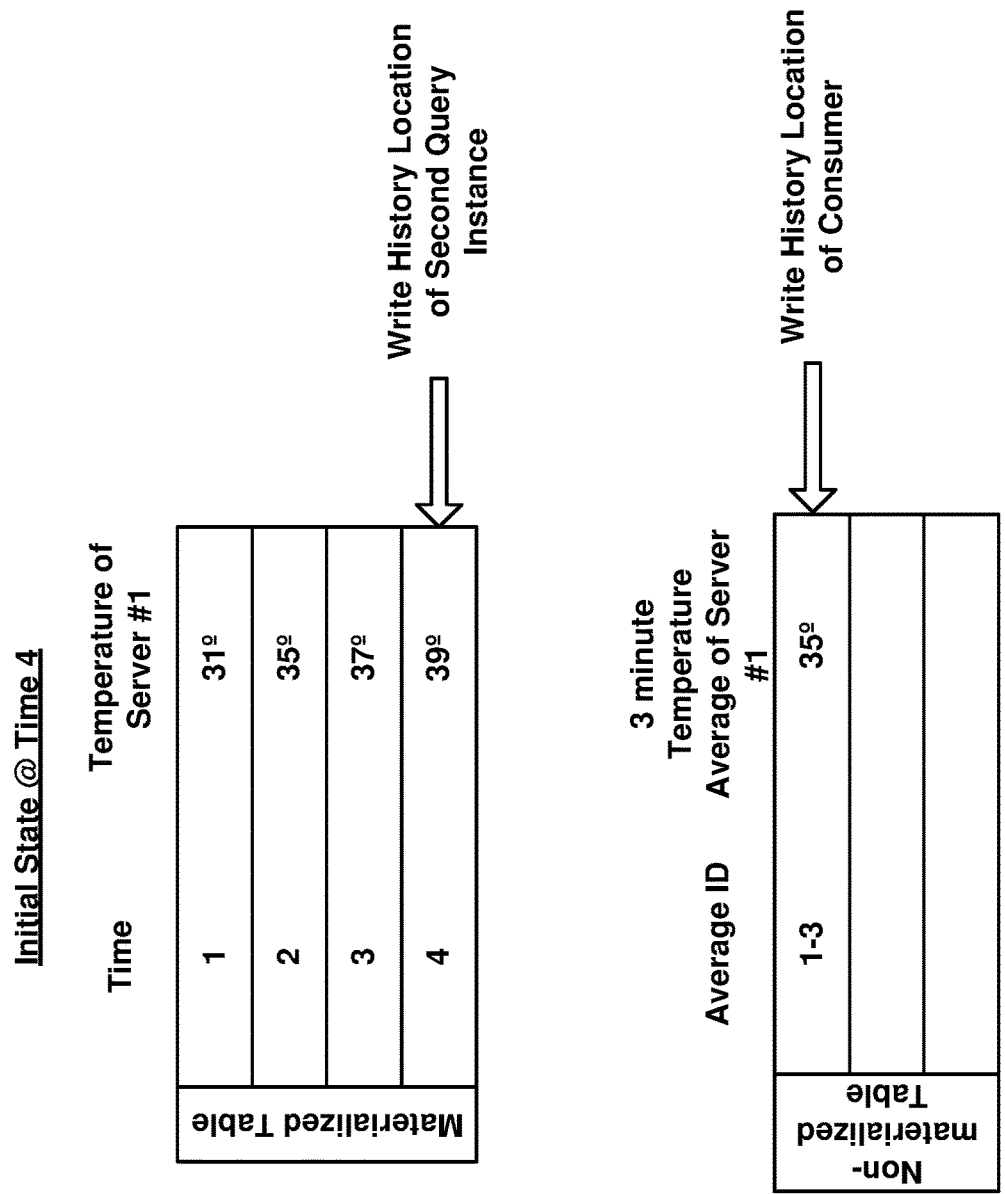

US 10,642,844 B2

NON-MATERIALIZED TABLES WITH STANDING QUERIES

BACKGROUND

Computing devices may store information in memory. In a network environment, multiple computing devices may interact as components of a system. Sometimes computing devices in a first location need to access information stored in the memory of a second computing device in a second location. Similarly, computing devices in a first location may need to write information to the memory of a second computing device.

SUMMARY

In one aspect, a network device in accordance with embodiments of the invention includes a database including a materialized table and a non-materialized table; a standing query instance that to generates an output that is stored in the non-materialized table. The database obtains a request that specifies the output, and provides the output in response to the request.

In one aspect, a method of operating a network device in accordance with embodiments of the invention includes obtaining a request for data stored in a non-materialized table; and, in response to the request: determining that the data is not present in the non-materialized table, regenerating the data, and providing the regenerated data as the data.

In one aspect, a non-transitory computer readable medium in accordance with embodiments of the invention stores instructions that when executed by a network device cause the network device to obtain a request for data stored in a non-materialized table; and in response to the request: determine that the data is not present in the non-materialized table, regenerate the data, and provide the regenerated data as the data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 8C shows a flowchart of a method of generating observers in accordance with one or more embodiments of the invention.

FIG. 8D shows a flowchart of a method of generating modifiers in accordance with one or more embodiments of the invention.

FIG. 8E shows a flowchart of a second method of generating observers in accordance with one or more embodiments of the invention.

FIG. 8F shows a flowchart of a second method of generating modifiers in accordance with one or more embodiments of the invention.

FIG. 11B shows a diagram of a materialized table and a non-materialized table of the example at a first time of FIG. 11A.

DETAILED DESCRIPTION

Figure 1A:
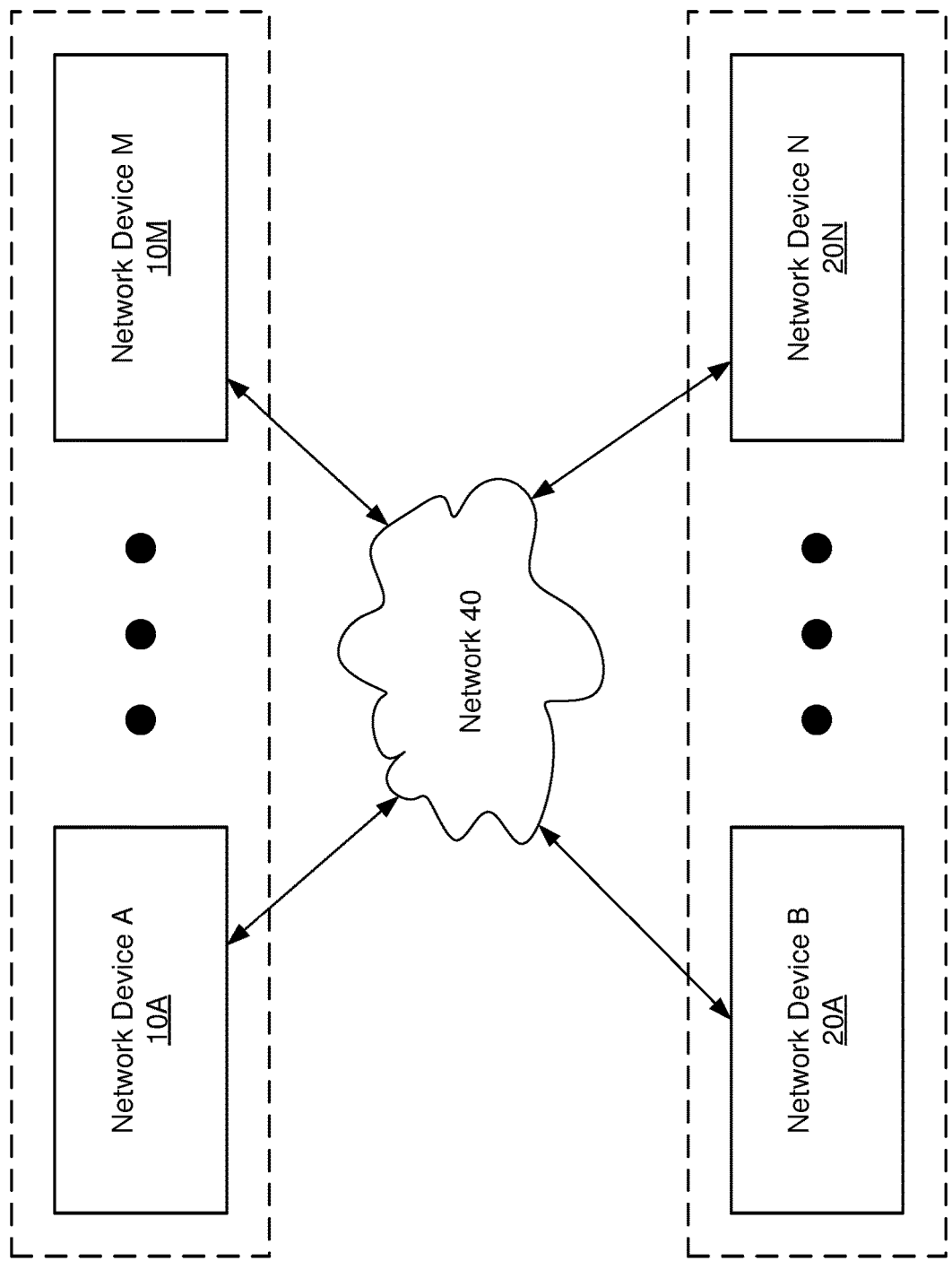
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for storing and/or accessing information stored in one or more network devices. Each of the network devices may be a router, switch, multilayer switch, or other device that may support network communications or may interact with other devices through the network.

The stored information may relate to a state of the network device, a state of a network to which a network device is connected, and/or a state of one or more services operating on a network device. For example, the stored information may be a temperature of a component of the network device. The component may be, for example, a processor. In another example, the stored information may be an accessibility of another network device. The stored information may be other information without departing from the invention.

A network device in accordance with one or more embodiments of the invention may include a database. The database may include tables that store information. In one or more embodiments of the invention, the database may span across multiple network devices, e.g., portions of the database may be stored on storage of a first network device and other portions of the database may be stored on storage of a second network device. In one or more embodiments of the invention, duplicate copies of information stored in the database may be stored on the first network device and the second network device. In one or more embodiments of the invention, a database planner may manage the consistency of the database across one or more network devices, e.g., may make copies of information stored on a first network device and/or update information stored on multiple network devices.

The network device may include a standing query service (SQS) manager. The SQS manager may generate and/or manage instances of standing queries SQs that operate on information stored in the database. Instances of SQ may be generated in response to requests from other entities. In one or more embodiments of the invention, the other entities may be agents executing on the network device or agents executing on other network devices. The SQS manager may also manage other types of queries such as one-shot queries that terminate upon generation of a result. While described with respect to standing queries below, the techniques described here may be applied to any type of query.

Each instance of a SQ may include an input table, a query, and may generate an output. An instance of the SQ may operate on entries of the input table to produce the output. In one or more embodiments of the invention, the instance of the SQ may generate an output in response to a change in an input table of the instance of the SQ. In one or more embodiments of the invention, the instance of the SQ may generate an output after one or more predetermined changes to the input table have occurred. In one or more embodiments of the invention, the instance of the SQ may produce an output at a predetermined time, e.g., periodically or at one or more predetermined times.

The entries of input tables of an instance of a SQ may be generated by observers. Observers may monitor entries of the database and/or output tables of other instances of SQSs and propagate changes to the database and/or output tables to input tables associated with the observer. In one or more embodiments of the invention, observers may also propagate changes to entries of the database to one or more agents of the network device.

In one or more embodiments of the invention, the output produced by the query of a SQ instance may be propagated to an output table using a modifier. Modifiers may may be an interface by which a SQ may propagate the output of the SQ to an output table. Once propagated to the output table, the output may be stored as content of the output table. In one or more embodiments of the invention, the output table may be a portion of the database, e.g., a table of the database or entries of a table of the database. The output may be stored as a content of the database.

In one or more embodiments of the invention, the output table may be materialized or non-materialized. A table that is materialized may continue to store and provide the output to consumers after all of the consumers have consumed the output. A table that is non-materialized may delete the output stored in the table after the output has been consumed by all consumers of the output. The deletion of the output stored in the able as content may be a local deletion, a local removal, or the content may be uncached. While not physically present, the output store as content of the output table that is deleted may remain logically part of the content of the output table.

In one or more embodiments of the invention, a non-materialized table that has deleted, e.g., locally deleted, removed, or uncached, an output stored as a content of the non-materialized table that has been read by all consumers of the content may be capable of initiating a process to regenerate the deleted output. For example, a number of consumers may read an output stored in a non-materialized table and the output maybe deleted after the output is consumed. Subsequent to the output being deleted, an entity may request to read the output that has been deleted. In response to the request, the non-materialized table may initiate the regeneration process.

FIG. 1A shows an example of a network in accordance with one or more embodiments of the invention. The example network shown in FIG. 1 includes network devices (10A-10M) operably connected to one another. Each of the aforementioned network devices may be interconnected by a network (40) supporting one or more networking protocols. For example, network device 10A may be connected by operable communication links to network devices 10M, 20A, and 20N as indicated by the arrows. The network (40) may include any number of network devices without departing from the invention. Additionally, each of the aforementioned network devices may include any number of communication links without departing from the invention. In one embodiment of the invention, the network (40) may be the Internet. In another embodiment of the invention, the network (40) may be an intranet. The intranet may be connected to the Internet.

Figure 1B:
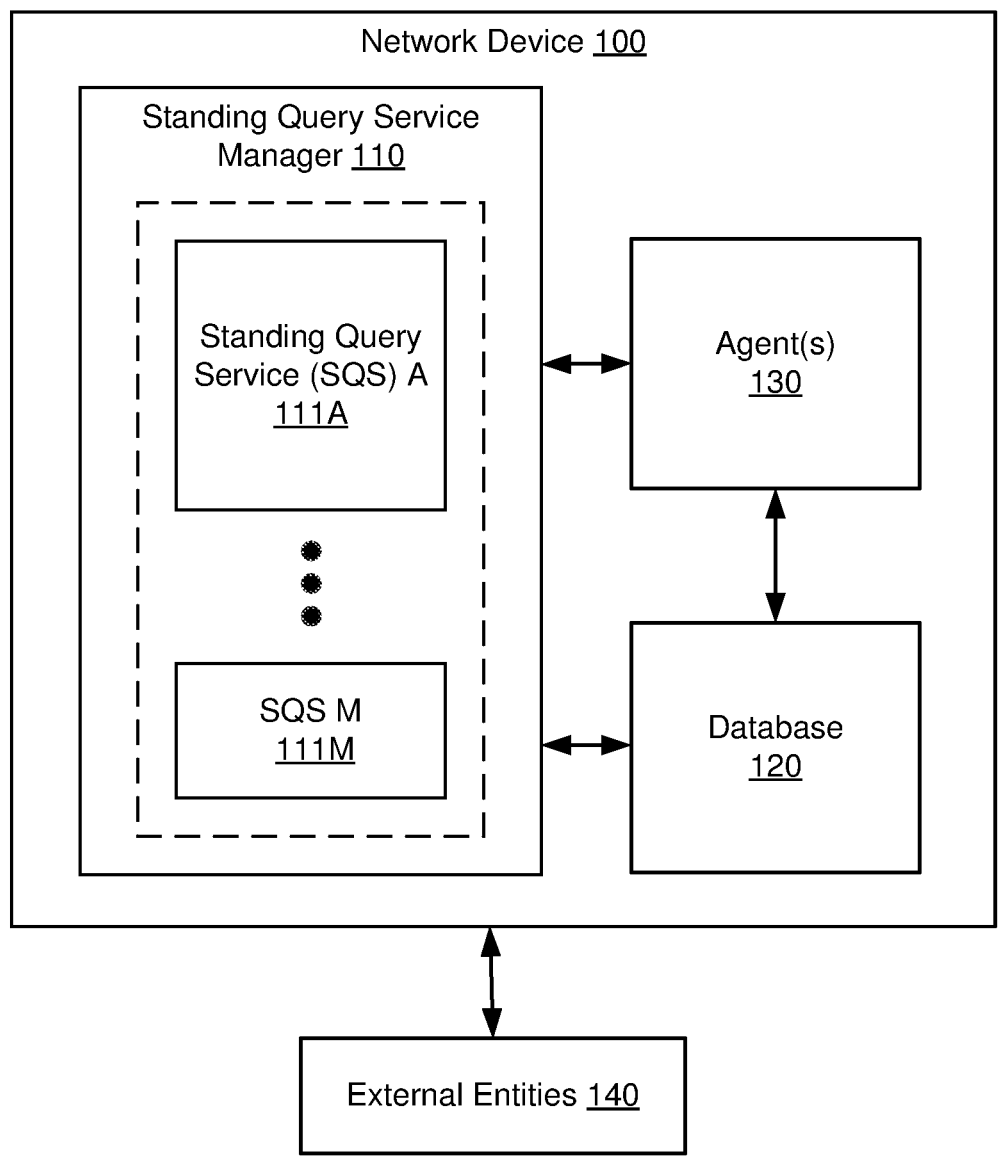
FIG. 1B shows a diagram of a network device in accordance with one or more embodiments of the invention.

FIG. 1B shows a network device (100) in accordance with one or more embodiments of the invention. The network device (100) may be configured to store information in a database (120) and generate outputs based on the information stored in the database (120) by one or more instances of SQSs. The generated output may be stored in materialized tables, e.g., stored in tables of the database that persist until deleted by a user, or stored in non-materialized tables, e.g., stored in tables that automatically delete output stored in the table after the output has been read by all consumers associated with the output. In one or more embodiments of the invention, an output stored in a non-materialized table may utilize fewer resources over time than an output stored in a materialized table and, thus, is a low resource storage output.

The network device (100) may be a physical device that includes non-transitory storage, memory (e.g. Random Access Memory), and one or more processors. The non-transitory storage may include instructions which, when executed by the one or more processors, enable the network device (100) to perform the functions described in this application and shown in FIGS. 8A-10A.

The network device (100) may include a SQS manager (110), one or more standing query services (111A-111M), a database (120), and a one or more agents (130). The network device (100) may be operably connected to one or more entities (140). The entities (140) may be, for example, other network devices, servers, or computing devices accessible by a network. Each of the components of the network device (100) is described below.

The network device (100) may include a database (120). The database (120) may be a managed storage database that controls read and/or write access to information stored in the database. Read access to the database (120) may be provided by one or more observers and write access to the database may be provided by one or more modifiers. Observers and modifiers may be dynamically generated and removed. Observers and modifiers may be registered with the database (120) and thereby notify the database (120) of their presence. The interaction of observers and modifiers with the database are described in greater detail with respect to FIGS. 6A-7B.

Figure 2:
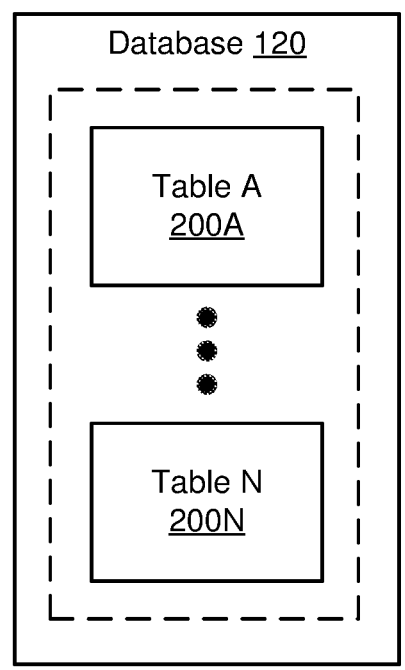
FIG. 2 shows a database in accordance with one or more embodiments of the invention.
Figure 2:
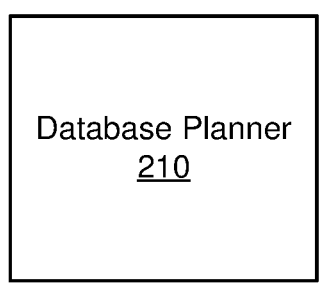

In one or more embodiments of the invention, the database (120) may include one or more tables (200A-200N) as shown in FIG. 2. The tables (200A-200N) may be data structures for storing information on a computer readable storage medium of the network device (100). Each element of each table may include one or more information elements. Information elements may be, for example, integers, characters, floating point values, addresses, or any other type of data.

In one or more embodiments of the invention, each table (200A-200N) may be materialized or a non-materialized table. In other words, each table may continue to store output stored in the table after the output has been read by each consumer, e.g., a materialized table, or may delete the output stored in the table after the output has been read by each consumer, e.g., a non-materialized table. Consumers may be, for example, agents, other queries, observers, or other entities.

Figure 5A:
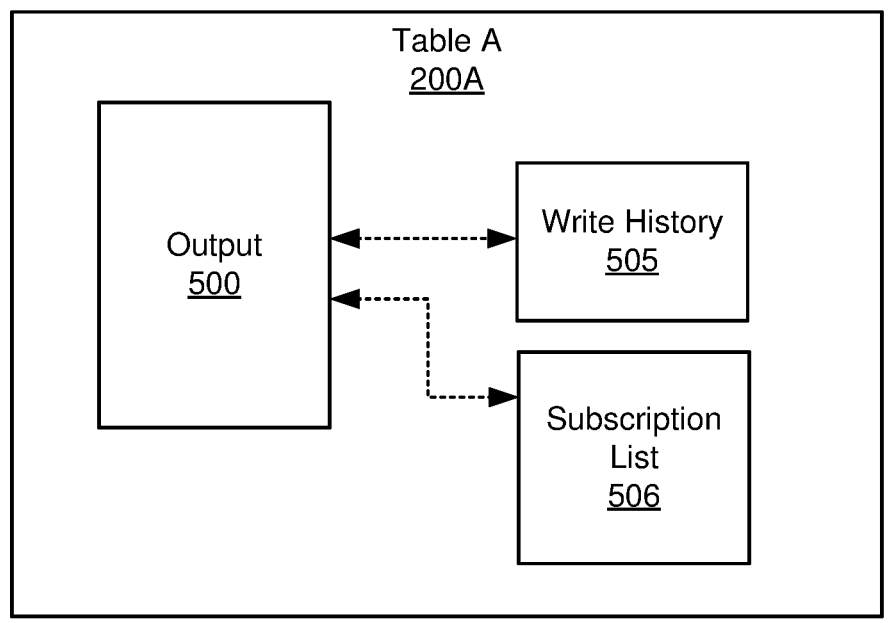
FIG. 5A shows a table of a database in accordance with one or more embodiments of the invention.

FIG. 5A shows an example of Table A (200A) in accordance with one or more embodiments of the invention. Table A (200A) includes output (500) stored as information elements of the table. As discussed above, each information element may include data of varying types.

The Table A (200A) may include a write history (505) associated with the output (500). The write history (505) may specify an order in which each element of the output (500) was stored, e.g., a sequential-chronological listing of the order in which each element of the output (500) was stored in Table A (200A). In one or more embodiments of the invention, the write history (505) may include a time stamp or system timing indicator associated with each output stored in Table A (200A) that specifies a point in time in which each output was stored in the table.

In one or more embodiments of the invention, the write history of a table that is non-materialized may be dynamically updated when output stored in the table has been deleted in response to all consumers of the output having consumed the output.

For example, a table may include four outputs written at times 1, 2, 3, and 4, respectively. Two consumers, reflecting all of the consumers that will consume the data stored in the table, may consume the output written at time 1. In response to the consumption of the output stored at time 1, the table may delete the output stored at time 1. In response to deleting the output stored at time 1, the history list may be updated to specify that only the outputs stored at times 2, 3, and 4 are stored in the table.

Figure 5B:
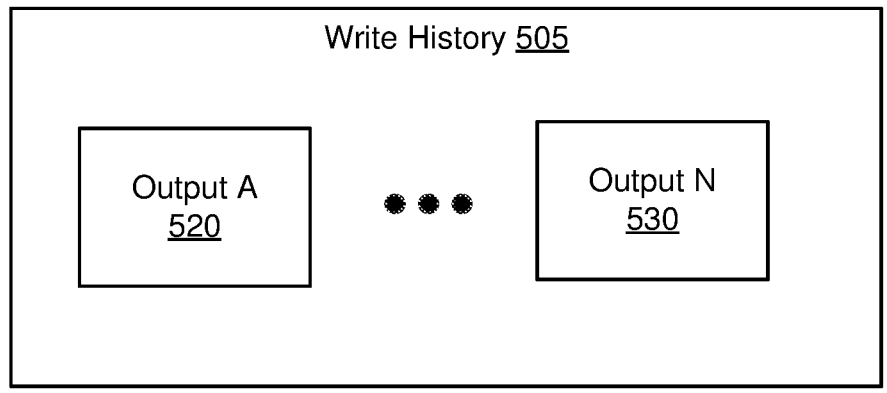
FIG. 5B shows an example of a write history of a materialized table in accordance with one or more embodiments of the invention.

FIG. 5B shows an example of a write history (505) of a materialized table. The write history (505) includes entries (520, 530) associated with each output stored in the output (500). Each entry (520, 530) specifies an ordering of the output stored in the output (500) in the order each output was stored in the table.

Figure 5C:
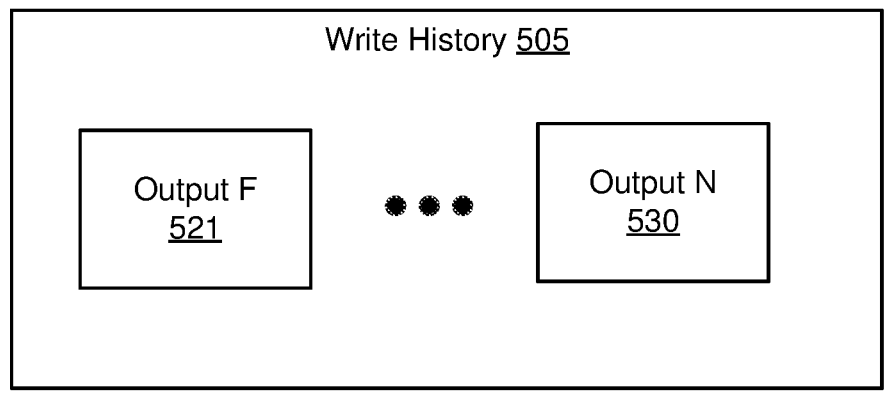
FIG. 5C shows an example of a write history of a non-materialized table in accordance with one or more embodiments of the invention.

In contrast, FIG. 5C shows an example of a write history (505) of a non-materialized table. The write history (505) of the non-materialized table includes entries (521, 530) that specify an ordering of the output stored in the output (500) in the order each output was stored in the table and that is still stored in the table. In other words, the write history (505) of the non-materialized table does not retain the ordering and/or time stamp for entries of the table that have been deleted due to being consumed by all of the consumers. For example, the write history (505) of the non-materialized table in this example has a first entry of output F rather than output A shown in FIG. 5B.

Returning to FIG. 5A, the Table A (200A) may include a subscription list (506) that specifies each consumer that is consuming data stored in Table A (200A). The subscription list also specifies a location of each consumer within the write history (505). The location of each consumer may indicate the elements of the output (500) that the consumer has not yet consumed, e.g., not yet read. Each consumer may be at a different location within the write history.

Figure 3:
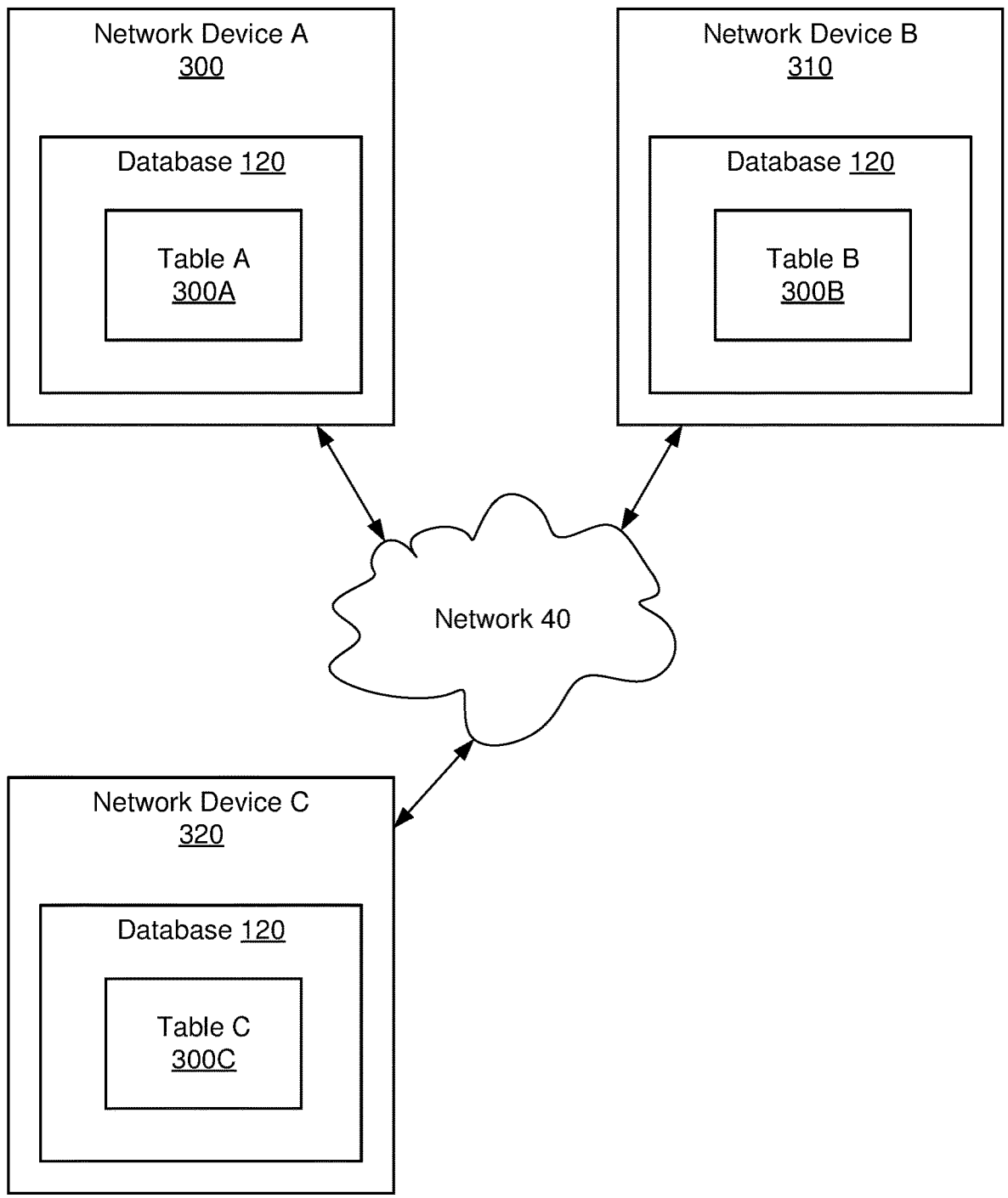
FIG. 3 shows a diagram of a database distributed across multiple network devices in accordance with one or more embodiments of the invention.
Figure 4:
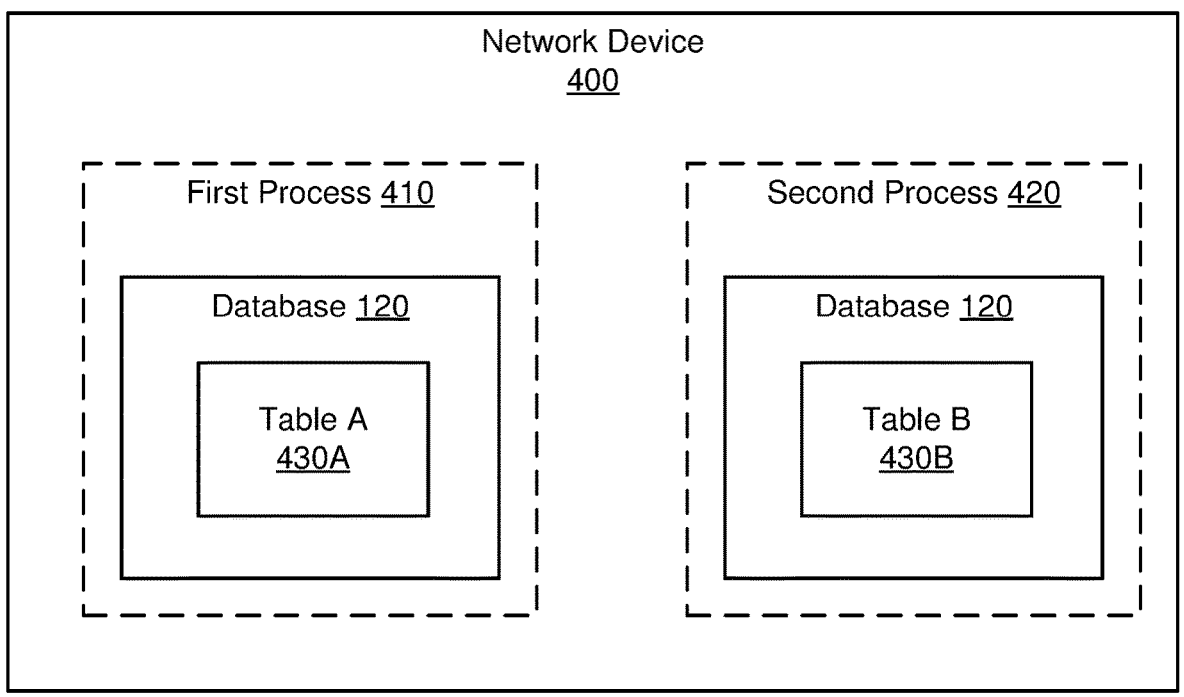
FIG. 4 shows a diagram of a database distributed across multiple processes in accordance with one or more embodiments of the invention.

Returning to FIG. 2, the database (120) may include tables (200A-200N) that are located on multiple network devices and/or are stored in multiple address spaces. FIGS. 3 and 4 illustrate examples of tables distributed across multiple devices and/or multiple address spaces.

In one or more embodiments of the invention, the database (120) may span across multiple network devices as shown in FIG. 3. FIG. 3 shows an example of a database (120) spanning across multiple network devices (300, 310, 320) connected by a network (40) in accordance with embodiments of the invention. The database (120) spans across each of the network devices and includes tables (300A, 300B, and 300C) stored on a computer readable storage medium of each network device, respectively. For example, Table A (300A) may be stored on a computer readable storage medium of network device A (300), Table B (300B) may be stored on a computer readable storage medium of network device B (310), and/or Table C (300C) may be stored on a computer readable storage medium of network device C (320). Each of the tables (300A, 300B, 300C) may include the same information, e.g., duplicate, or different information, e.g., non-duplicative. In some embodiments, each of the tables (300A, 300B, and 300C) may include duplicate and non-duplicate information.

For example, each of the tables (300A, 300B, and 300C) may include a first entry that comprises the maximum data transmission speed of the network (40). Table A (300A) may also include a second entry, not present in either Table B (300B) or Table C (300C), that comprises the current temperature of a processor of network device A (300).

In one or more embodiments of the invention, the database (120) may span across multiple processes in separate address spaces executing on a single network device. FIG. 4 shows an example of a database (120) spanning across a first process (410) and a second process (420) of a network device (400) in accordance with embodiments of the invention. The database (120) spans across each of the processes (410, 420) and includes tables (430A, 430B) stored on a computer readable storage medium of the network device (400). Table A (430A) and Table B (430B) may be stored in different address spaces allocated to the first process (410) and the second process (420), respectively. Each of the tables (430A, 430B) may include the same information, e.g., duplicate, or different information, e.g., non-duplicative. In some embodiments, each of the tables (430A, 430B) may include duplicate and non-duplicate information.

For example, each of the tables (430A, 430B) may include a first entry that comprises a maximum inter-process memory transport rate of the network device (400). Table A (430A) may also include a second entry, not present in Table B (430B), that comprises the quantity of storage allocated to the first process (410).

Returning to FIG. 2, the network device may include a database planner (210). The database planner (210) may manage the database (120). Managing the database (120) may comprise maintaining the location of each table of the database and facilitating inter network device and/or inter process memory transfers between tables of the database. For example, an agent present on a first network device may request to read data from a table that is present on a second network device. In response to the request from the agent, the database planner (210) may provide the location of the table on the second network device and thereby enable the agent to retrieve the data from the second table. In one or more embodiments of the invention, the database planner (210) may generate an observer, in response to requests from entities. The generated observer may retrieve data from a table of the database and provide the data to the requesting entity. In some embodiments of the invention, managing the database (120) may include maintaining the location of each table of the database across shared memory.

In one or more embodiments of the invention, the database planner (210) may include a data structure, e.g., a list, tree, or other structure, that includes the location of each unique entry of the database (120). A unique entry may be an entry of a table where information is first written into the database (210). The information may be subsequently written to other entries of other tables of the database as duplicative information. The data structure may include the information necessary to determine the location of each unique entry of the database (120) and thereby enable data included in any entry of the database (120) to be retrieved and or duplicated to other tables of the database (120).

Embodiments of the invention are not limited to database planners that include information that specifies the location of each unique entry of the database. The database planner may include information that specifies the structure of the database, e.g., tables, entries, content, keys, etc., at different levels of granularity without departing from the invention. For example, in some embodiments of the invention, the database planner may include information that specifies the location of each table rather than information that specifies each unique entry of the database.

In one or more embodiments of the invention, the database planner (210) may be executing on the network device and comprise functionality to update each table of the database (120) in response to a change in an entry of the database. For example, the database planner (210) may include functionality to identify changes to entries of a first table of the database and propagate those changes to the other tables of the database by writing duplicative information to each of the other tables. In one or more embodiments of the invention, the database planner (210) may include functionality to monitor entries of a first table and notify other tables of changes to the entries of the first table. In response to the notification, the other tables may note that the entries of the first table have changed and may thereby notify, in response to requests from agents or other entities, the agents or other entities that entries of the first table have changed.

Thus, the database planner (210) may enable the database (120) to provide information to an agent or other entity of the location of any entry of any table of the database (120).

Returning to FIG. 1B, in one or more embodiments of the invention, the SQS manager (110) may include functionality to manage SQSs. The SQS manager (110) may manage one or more SQSs (111A-111M).

Managing SQSs may include generating instances of SQSs in response to requests from agents (130), generating observers associated with instances of the SQSs (111A-111M), and/or generating modifiers associated with the instances of the SQSs (111A-111M). The SQS manager (110) may generate instances of SQSs (111A-111M), observers, and modifiers based on information stored in or derived from the database (120) and/or a database planner (210, FIG. 2). Instances of SQSs may include an output that is stored in materialized or non-materialized tables. The SQS manager (110) may generate a SQS instance so that the output is stored in a materialized or non-materialized table based on information included in a request for a new SQ instance. Methods of managing the instances of the SQSs are further described with respect to FIGS. 8A-E and SQSs are further described with respect to FIGS. 6A-7B.

In one or more embodiments of the invention, the SQS manager (110) may be an embedded hardware device. The embedded hardware device may be, for example, a field programmable gate array (FPGA), application specific integrated circuit (ASIC), and/or digital signal processor (DSP). Other embedded hardware devices may be used without departing from the invention. In one or more embodiments of the invention, the embedded hardware device may be a component of an external entity (140) and provide the functionality by remotely communicating with the network device (100) by a network.

In one or more embodiments, the SQS manager (110) may comprise instructions, stored on a non-transitory computer readable storage medium, that when executing on a processor of the network device (100) cause the network device (100) to perform the functionality of the SQS manager (110). In one or more embodiments of the invention, the SQS manager (110) may be executing on processors of external entities (140) and cause the network device (100) to perform the functionality of the SQS manager (110) by remotely communicating with the network device (100) by an operable connection.

Figure 6A:
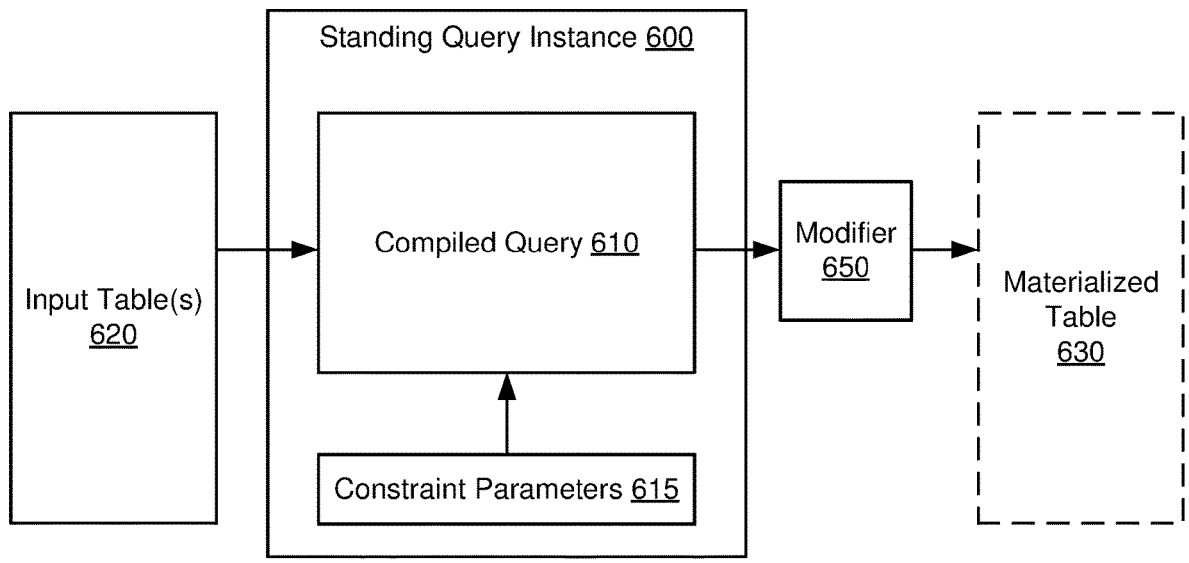
FIG. 6A shows a diagram of a standing query instance including a materialized output in accordance with one or more embodiments of the invention.

Each of the SQSs (111A-111M) may include one or more instances of a standing query (SQ). An example of a SQ instance (600) that stores output in a materialized table in accordance with one or more embodiments of the invention is shown in FIG. 6A. The SQ instance (600) includes a compiled query (610) and one or more constraint parameters (615). Each of the components of the example SQ instance (600) is described below.

The SQ instance (600) may include a compiled query (610). The compiled query (610) may include instructions that, when executed by a processor, generate an output based on information included in an input table(s) (620) associated with the SQ instance (600) and constraint parameters (615)

of the SQ instance (600). In one or more embodiments of the invention, the compiled query (610) may generate output in response to a change in value of one or more entries of the input table(s) (620). In one or more embodiments of the invention, the compiled query (610) may generate output at predetermined times. In one or more embodiments of the invention, the predetermined times may be periodic, e.g., the compiled query (610) may generate an output every five seconds. In one or more embodiments of the invention, the predetermine time may be determined based on the occurrence of an event. The even may be, for example, new input becoming available.

The constraint parameters (615) may modify the manner in which the compiled query (610) generates an output, e.g., scales output, excludes input used to determined output, modifies weight of an input, etc.

The input table(s) (620) may be a data structure including one or more elements. The elements of the input table(s) (620) may be generated by one or more observers, as will be discussed in greater detail with respect to FIG. 7A.

Output generated by the compiled query (610) may be sent to a modifier (650) associated with the SQ instance (600). The modifier (650) may propagate the output of the SQ instance (610) to the materialized table (630) associated with the SQ instance (600). The materialized table (630) will be discussed in greater detail with respect to FIG. 7A.

Figure 6B:
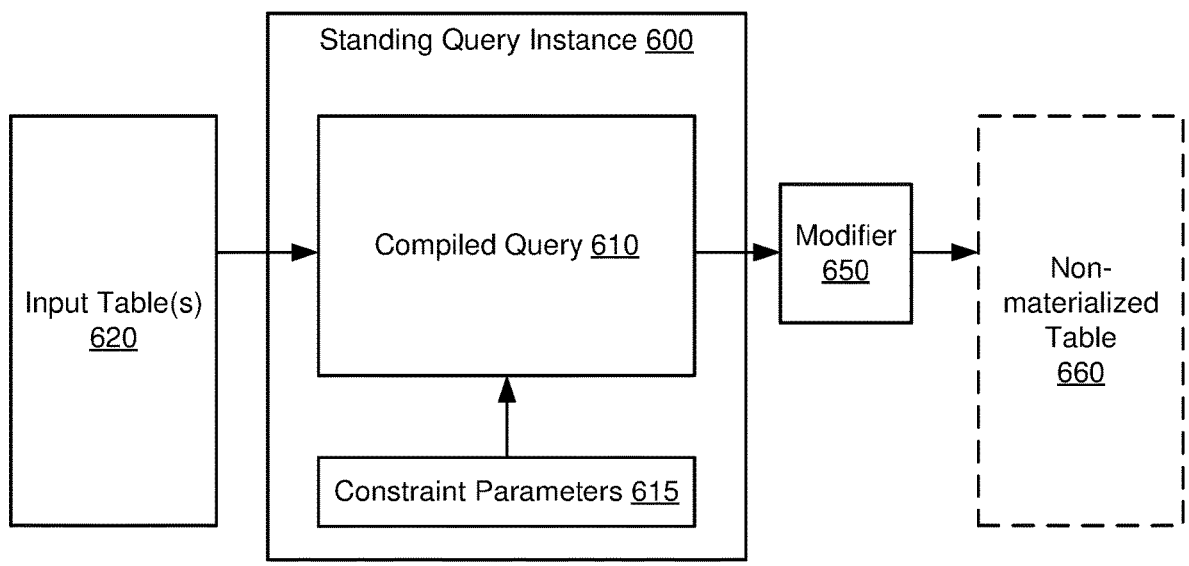
FIG. 6B shows a diagram of a standing query instance including a non-materialized output in accordance with one or more embodiments of the invention.

An example of a SQ instance (600) that stored output in a non-materialized table (660) in accordance with one or more embodiments of the invention is shown in FIG. 6B. A SQ instance that stores output in a non-materialized table (660) may utilize fewer resources, e.g., storage space, computing resources, than a SQ instance that stores output in a materialized table.

Returning to FIG. 1B, the network device (100) may include one or more agents (130) executing on the network device (100) in accordance with one or more embodiments of the invention. The agents (130) may interact with the database (120) of the network device (100), e.g., the agents may desire to read and/or write data to and/or from the database (120). For example, the agents (130) may generate data to be stored in the database (120) or may need to read information from the database (120). In response to read or write requests from the agents (130), the database (120) and/or the database planner (210, FIG. 2) may generate observers or modifiers as required to facilitate the transfer of information between the database (120) and the agents (130).

The agents (130) may also interact with the SQS manager (110) of the network device (100). In some cases, an agent (130) may wish to determine information derived from information stored in the database (120). The agent (130) may send a request for a new instance of a SQS to the SQS manager (110) to determine the derived information. The SQS manager (110) may generate a new instance of the SQS in response to the request and one or more observers to propagate information generated by the new instance of the SQS to the agent (130). The SQ instance may be generated, along with an appropriate modifier, to store output generated by the SQ instance in a materialized or non-materialized table depending on the information included in the request, e.g., depending on whether the request specifies that the output should be stored in a materialized or non-materialized table. In one or more embodiments of the invention, requests for new query instances that do not specify whether the output should be stored in a materialized or non-materialized table may by default be generated to store the output in a materialized table.

Figure 7A:
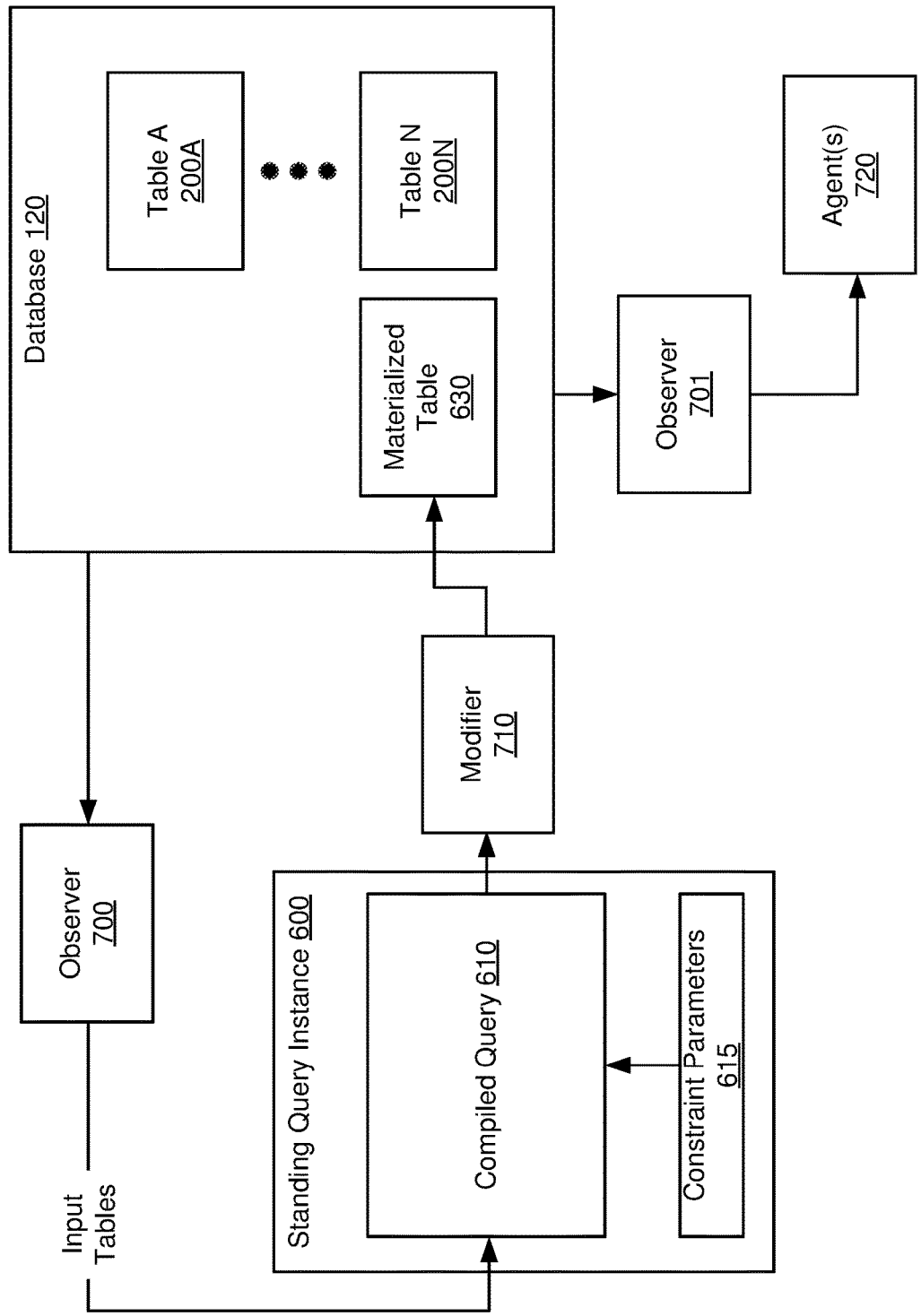
FIG. 7A shows a diagram of a standing query including a materialized output interacting with a database in accordance with one or more embodiments of the invention.

FIG. 7A shows the example of a SQ instance (600) including a materialized output, shown in FIG. 6A, interacting with a database (120) in accordance with one or more embodiments of the invention. In the example shown in FIG. 7, the SQ instance (600), observers (700, 701), and modifier (710) were generated in response to a request from an agent (720). The request included a query type to be generated, constraint parameters, and a list of one or more information elements of the database (120) to be used as input to the compiled query (610).

A first observer (700) was generated to read information from the database (120) and supply the information to the compiled query (610) via an input table. More specifically, the first observer (700) observes information elements stored in one or more tables (200A-200N) of the database and propagates the information to the compiled query (610).

A second observer (701) was generated to read output, generated by the compiled query (610), stored in the materialized table (630), which receives the output generated by the SQ instance (600), and supply the output to the agent (720) that requested the SQ instance (600).

A modifier (710) was generated to propagate output generated by the compiled query (610) to the materialized table (630). While the materialized table (630) is shown as a separate table in FIG. 7A, the materialized table (630) may be a portion of any table of the database (120) without departing from the invention.

Thus, as shown in FIG. 7A, SQ instances interacting with the database (120) read and write information to or from the database by observers and modifiers, respectively. Similarly, agents interacting with the database (120) also read and write information to or from the database by observers and modifiers.

Figure 7B:
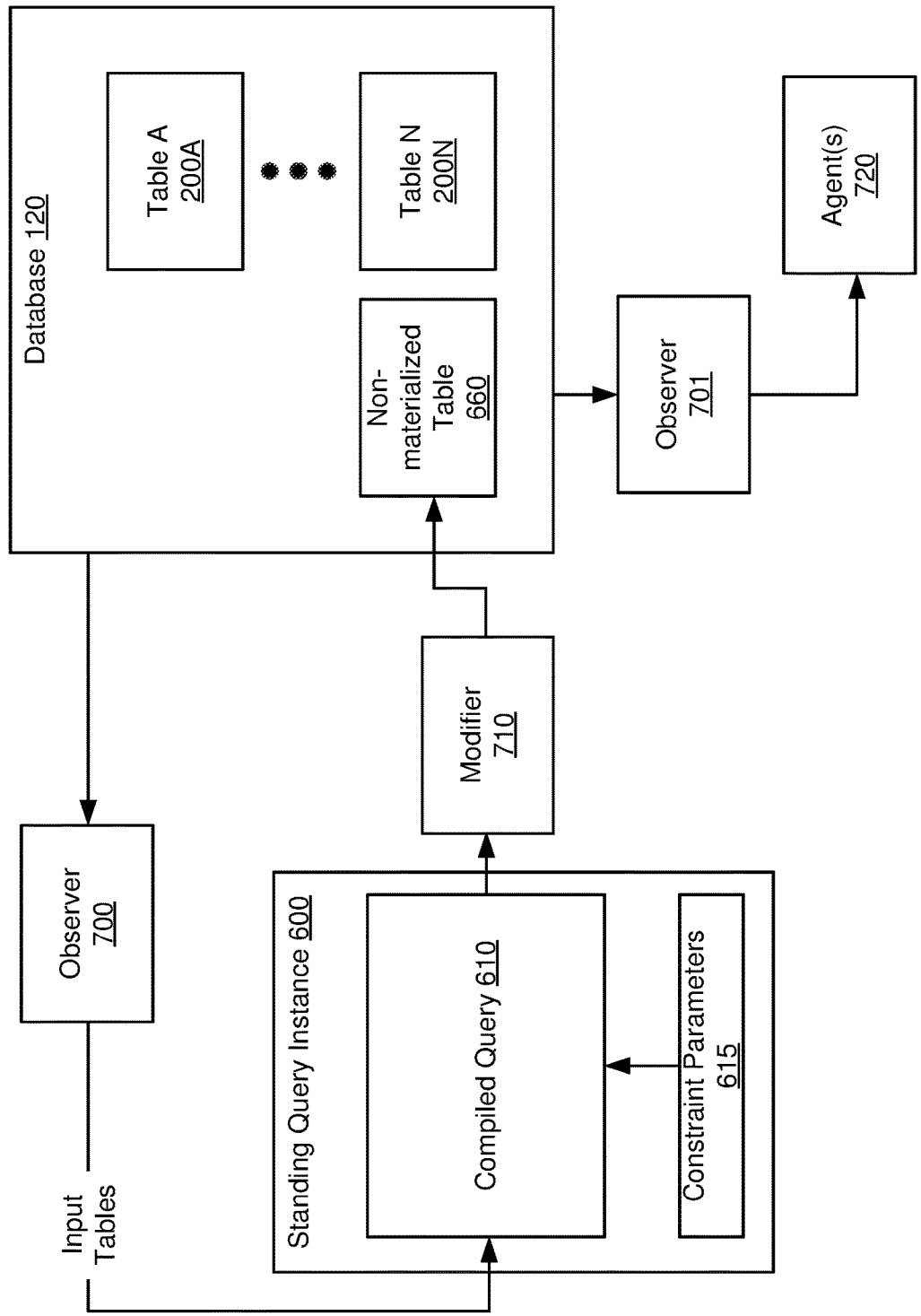
FIG. 7B shows a diagram of a standing query including a non-materialized output interacting with a database in accordance with one or more embodiments of the invention.

FIG. 7B shows the example of a SQ instance (600) including a non-materialized output, shown in FIG. 6B, interacting with a database (120) in accordance with one or more embodiments of the invention. In the example shown in FIG. 7B, the SQ instance (600), observers (700, 701), and modifier (710) were generated in response to a request from an agent (720). The request included a query type to be generated, constraint parameters, and a list of one or more information elements of the database (120) to be used as input to the compiled query (610).

A first observer (700) was generated to read information from the database (120) and supply the information to the compiled query (610) via an input table. More specifically, the first observer (700) observes information elements stored in one or more tables (200A-200N) of the database and propagates the information to the compiled query (610).

A second observer (701) was generated to read output, generated by the compiled query (610), stored in the non-materialized table (660) associated with the SQ instance (600) and supply the output to the agent (720) that requested the SQ instance (600).

A modifier (710) was generated to propagate output generated by the compiled query (610) to the non-materialized table (660), in contrast to the materialized table as shown in FIG. 7A. While the non-materialized table (660) is shown as a separate table in FIG. 7B, the non-materialized table (660) may be a portion of any table of the database (120) without departing from the invention.

Thus, as shown in FIG. 7B, SQ instances that store output in a non-materialized table of the database (120) read and write information to or from the database by observers and modifiers, respectively. Similarly, agents interacting with the database (120) also read and write information to or from the database by observers and modifiers.

Figure 8A:
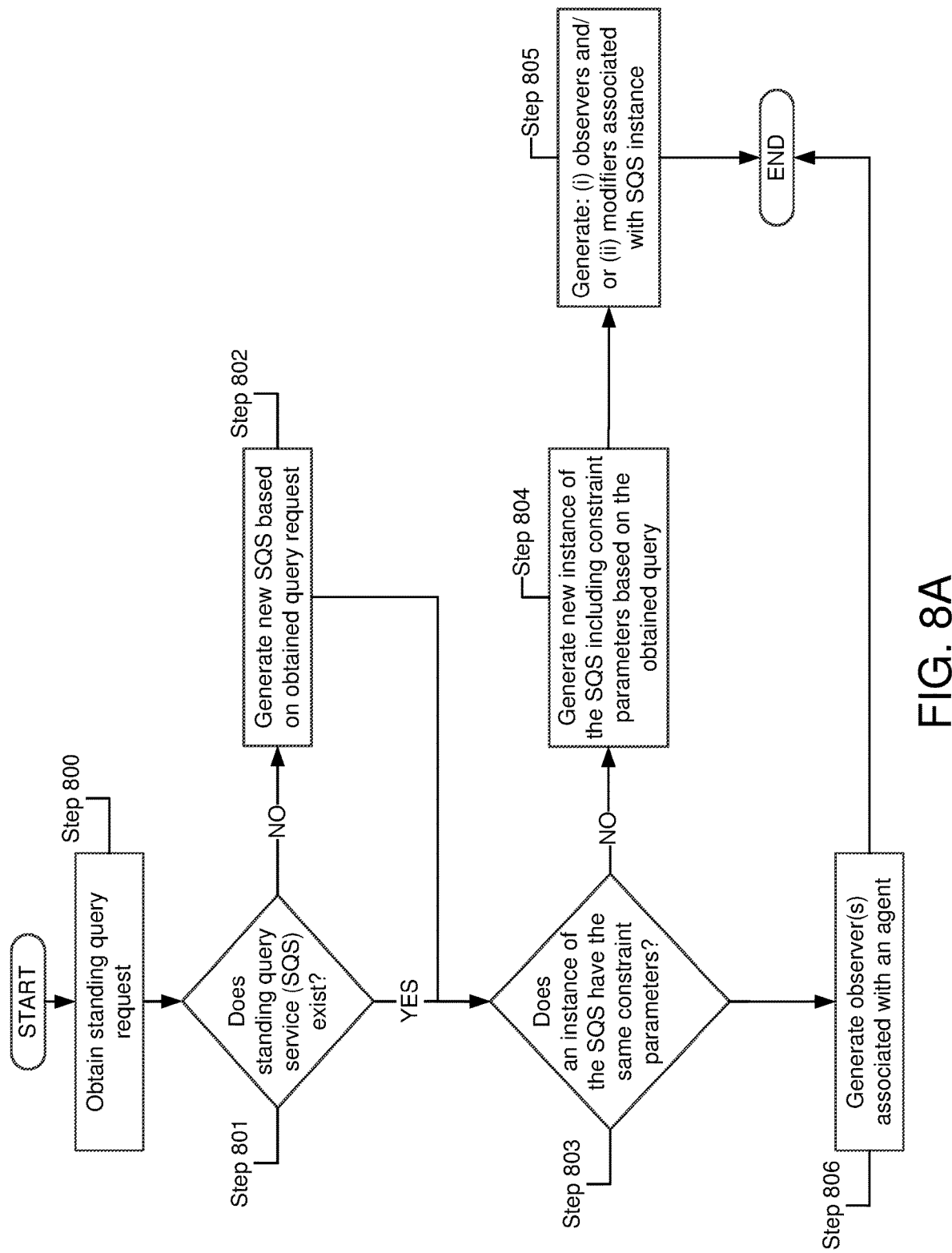
FIG. 8A shows a flowchart of a method of generating a standing query instance in accordance with one or more embodiments of the invention.

FIG. 8A shows a flowchart in accordance with one or more embodiments of the invention. The method depicted in FIG. 8A may be used to generate instances of SQSs in response to requests from agents in accordance with one or more embodiments of the invention. One or more steps shown in FIG. 8A may be omitted, repeated, and/or performed in a different order among different embodiments.

In Step 800, a SQS manager of a network device obtains a request for a new instance of a SQS. The SQS manager may obtain the request from a message from an agent. The agent may be executing on the network device on which the SQS manager is executing. The request may include a query type, one or more constraint parameters, and information stored in a database on which the new instance of the SQS is to operate.

In Step 801, the SQS manager determines whether a SQS matching the query type included in the request exists on the network device. If the query type does not match an existing SQS, the method proceeds to Step 802. If the query type does match an existing SQS, the method proceeds to Step 803.

In Step 802, the SQS manager generates a new SQS based on the obtained query request. Specifically, the SQS manager may generate a new SQS including the query type indicated in the obtained query request.

In one or more embodiments of the invention, generating a new SQS may include compiling a query. In one or more embodiments of the invention, generating a new SQS may include linking compiled byte code.

In Step 803, the SQS manager determines whether the constraint parameters of an instance of a SQS matches the constraint parameters, included in the obtained request, exists on the network device. If the constraint parameters of the obtained request do not match the constraint parameters of an existing instance of a SQS, the method proceeds to Step 804. If the constraint parameters of the obtained request do match the constraint parameters of an existing instance of a SQS, the method proceeds to Step 806.

In Step 804, the SQS manager generates a new SQ instance of the SQS, corresponding to the query type included in the obtained request, including constraint parameters based on the constraint parameters included in the obtained request. Specifically, the SQS manager may make a copy the compiled query associated with the SQS corresponding to the query type included in the obtained request and constraint the compiled query based on the constraint parameters included in the obtained request.

In one or more embodiments of the invention, the constraint parameters change the behavior of the compiled query. The constraint parameters may be variables, utilized by the compiled query, which change the output produced by the compiled query when operating on the same input.

In Step 805, the SQS manager generates observers and/or modifiers associated with the new SQ instance. The SQS manager may generate one or more observers associated with the new SQ instance that supplies the compiled query of the new SQ instance with data on which the compiled query operates. The observers may supply the data to an input table of the new SQ instance as shown, for example, in FIG. 7. The SQS manager may also generate one or more modifiers associated with the SQ instance that propagates output generated by the compiled query of the SQ instance. The modifiers may propagate the output generated by the compiled query to an output table associated with the new instance of the SQS. The output table may be a materialized table or non-materialized table depending on the requested table type for storage of the output included in the request of Step 800. If no table type, e.g., materialized or non-materialized, is specified in the request, a modifier that stores the output in a materialized table may be generated.

In one or more embodiments of the invention, the SQS manager may generate one or more observers associated with an agent from which the request was obtained in Step 800. The observer may be linked with the output table where data generated by the compiled query is stored and the agent from which the request was obtained in Step 800. The observer may propagate changes to the output table to the agent and thereby notify the agent of new output generated by the new instance of the SQ instance requested by the agent.

Returning to Step 803, the method may proceed to Step 806 if an existing SQ instance includes constraint parameters that are the same as those included in the SQ request obtained in Step 800.

In Step 806, the SQS manager generates observer(s) associated with an agent from which the new SQS request was obtained in Step 800. The observer may be linked with the output table where data generated by the existing SQ instance identified in Step 806 is stored and the agent from which the request was obtained in Step 800. The observer may propagate changes to the output table to the agent and thereby notify the agent of new output generated by the existing instance of the SQS. In other words, if an existing SQ instance includes the same constraint parameters as those of the request, an observer may be generated to propagate results of the existing SQ instance to the agent rather than generating a new SQ instance and a new modifier.

In one or more embodiments of the invention, the observer may propagate changes to the output table to an agent in response to a notification from the database that the element of the database the observer is observing, e.g., one or more elements of the output table, have changed.

In one or more embodiments of the invention, the observer may poll the database at predetermined times to determine if the observed elements of the database have changed. If the database indicates the observed elements of the database have changed, the observer may receive each modification to the observed elements from the database and propagate the modifications to the agent from which the SQ request was obtained in Step 800. In one or more embodiments of the invention, the predetermined times may be periodic, e.g., every 5 seconds. In one or more embodiments of the invention, the predetermined times may be intermittent. In one or more embodiments of the invention, the predetermined times may be anytime data is written to the database. In one or more embodiments of the invention, the predetermine time may be determined based on the occurrence of an event. The even may be, for example, new input becoming available.

Thus, the methods shown in FIG. 8A may be used to generate observers, modifiers, and SQ instances in response to requests from agents.

Figure 8B:
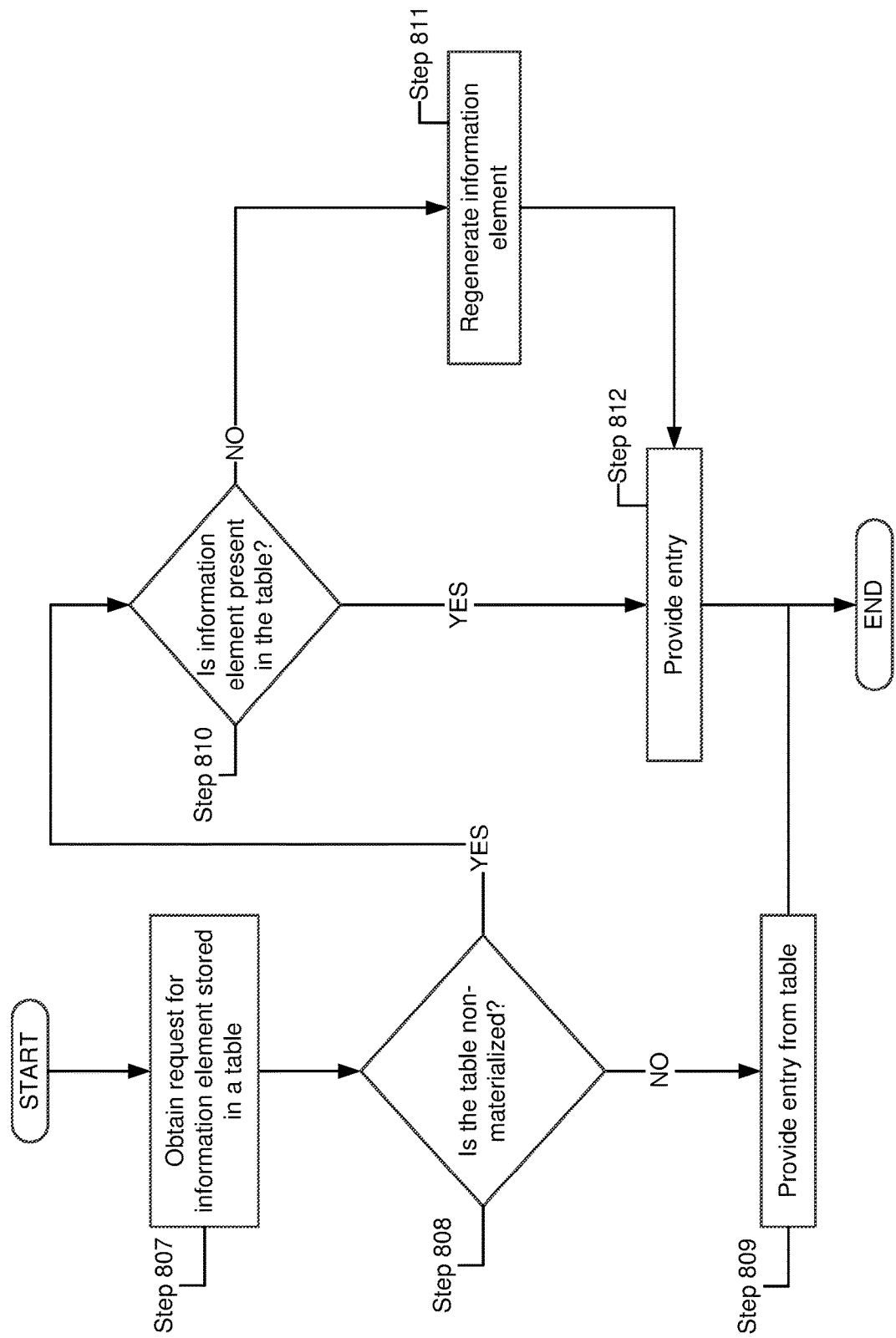
FIG. 8B shows a flowchart of a method of generating a standing query instance in accordance with one or more embodiments of the invention.

FIG. 8B shows a flowchart in accordance with one or more embodiments of the invention. The method depicted in FIG. 8B may be used to provide an output requested by an entity in accordance with one or more embodiments of the invention. One or more steps shown in FIG. 8B may be omitted, repeated, and/or performed in a different order among different embodiments.

In Step 807, a network device obtains a request for an information element stored in a table of a database. The request may be, for example, a request from an observer or a read request from another entity.

In Step 808, the SQS manager determines whether the table in which the information element is stored is a non-materialized table. If the table is a non-materialized table, the method proceeds to Step 810. If the table is not a non-materialized table, the method proceeds to Step 809.

In Step 810, the database determines whether the information element is present in the non-materialized table. The SQS manager may determine whether the information element is present based on the history list location of each consumer specified in a subscription list associated with the table in which the information element is stored. If the information element is present in the non-materialized table, the method proceeds to step 812. If the information element is not present in the non-materialized table, the method proceeds to step 811.

In Step 811, the database regenerates the information element. The database may regenerate the information element by sending a request to a query that generated the output stored in the information element. The request may be an inversion request. In one or more embodiments, regeneration is only permitted for non-materialized tables that store the output of a query that is invertible. Queries that are invertible may provide an inverter which services the request.

In one or more embodiments of the invention, the request may include keys or other information necessary for the query to obtain the input necessary to regenerate the row removed from the non-materialized table output. In one or more embodiments of the invention, the request includes only the key of the row of the non-materialized table in which the output is stored. Based on the key of the row of the non-materialized table in which the output is stored, the inverter may generate keys to input tables to retrieve rows or other information necessary for the query to obtain the input necessary to regenerate the row removed from the non-materialized table output.

In one or more embodiments of the invention, the inverter may be generated by the query compiler. In one or more embodiments of the invention, the inverter may be handwritten by a user and manually associated with the query.

The keys may specify elements of tables and/or time stamps so that the query may regenerate the output. Once regenerated, the regenerated output may be stored in the table or a temporary storage.

In Step 812, the database provides the information element either directly from the table if the information element is still present in the non-materialized table or provides the regenerated information element of Step 811 if the information element is not present in the non-materialized table, e.g., deleted prior to the request.

Returning to Step 809, the database provides the information element from the materialized table.

Thus, the method shown in FIG. 8B may enable a network device to provide an information element to a requesting entity if the information element is stored in a materialized table or if the information element was stored in a non-materialized table and deleted prior to the request.

FIG. 8C shows a flowchart in accordance with one or more embodiments of the invention. The method depicted in FIG. 8C may be used to generate observers in response to requests for SQ instances from agents in accordance with one or more embodiments of the invention. One or more steps shown in FIG. 8C may be omitted, repeated, and/or performed in a different order among different embodiments.

In Step 820, a SQS manager of a network device obtains one or more input table targets. The input table targets may be one or more elements of a database on which a requested SQ instance is to operate. The input table targets may be obtained from a request from an agent requesting the SQ instance.

In Step 822, the SQS manager selects one of the input table targets.

In Step 824, the SQS manager determines the location of the input table target selected in Step 822. The SQS manager may determine the location of the input table target by requesting the location from a database planner (210, FIG. 2) that manages the database (120, FIG. 2). The location of the input table target may be an entry of a table of the database (120, FIG. 2).

In Step 826, the SQS manager generates an observer based on the location of the input table target. The location of the input table target may be located in the same address space as the input table of the SQ instance, located in a different address space than the input table of the SQ instance, or located in a different address space of a different network device than the input table of the SQ instance. The SQS manager may generate observers linked to memory transport protocols and/or inter-device memory transport protocols to facilitate propagating information from the database to the input table of a SQ instance.

For example, if an input table is located in a different address space than the input table of the SQ instance, the SQS manager may generate a first observer, in the address space of the input table target, linked to a memory transport protocol between the address space of the input table target and the address space of the input table. The SQS may generate a second observer, in the address space of the input table, linked to the memory transport protocol between the address space of the input table target and the address space of the input table and thereby propagate changes to the input table target to the input table.

In a second example, if an input table is located in a different address space of a different network device, the SQS manager may generate a first observer, in the address space of the different network device of the input table target, linked to an inter-device memory transport protocol between the different network device and the network device on which the input table exists. The SQS may generate a second observer, in the address space of the input table, linked to the inter-device memory transport protocol between the different network device and the network device on which the input table exists and thereby propagate changes to the input table target to the input table.

In Step 828, the SQS manager determines whether all input table targets are observed by observers. If all input table targets are observed by observers, the method may end. If all input table targets are not observed by observers, the method may proceed to Step 822.

Thus, the method shown in FIG. 8C may be used to generate observers to propagate changes to input table targets located in a database to an input table of a SQ instance.

While the method shown in FIG. 8C is illustrated as generating unique observers for each input table target, one of ordinary skill in the art will appreciate that the method may be implements by utilizing a single observer that observes multiple input table without departing from the invention.

FIG. 8D shows a flowchart in accordance with one or more embodiments of the invention. The method depicted in FIG. 8D may be used to generate modifiers in response to requests for SQ instances from agents in accordance with one or more embodiments of the invention. One or more steps shown in FIG. 8D may be omitted, repeated, and/or performed in a different order among different embodiments.

In Step 830, a SQS manager of a network device obtains one or more output table targets. The output table targets may be one or more elements of a database on which a requested SQ instance is to propagate its output. The output table targets may be obtained from a request from an agent requesting the SQ instance.

In Step 832, the SQS manager selects one of the output table targets.

In Step 834, the SQS manager determines the location of the output table target selected in Step 832. The SQS manager may determine the location of the output table target by requesting the location from a database planner (210, FIG. 2) that manages the database (120, FIG. 2). The location of the output table target may be an element of a table of the database (120, FIG. 2).

In Step 836, the SQS manager generates a modifier based on the location of the output table target. The modifier may write data received from the SQ instance to the location of the output table target, e.g., one or more elements of a table of the database.

In Step 838, the SQS manager determines whether all output table targets have associated modifiers. If all output table targets have associated modifiers, the method may end. If all output table targets do not have associated modifiers, the method may proceed to Step 832.

Thus, the method shown in FIG. 8D may be used to generate modifiers to propagate output generated by the SQ instance to an output table of a database.

While the method shown in FIG. 8D is illustrated as generating unique modifiers for each output table target, one of ordinary skill in the art will appreciate that the method may be implemented by utilizing a single modifier associated with all of the output table targets without departing from the invention.

As discussed with respect to FIGS. 8C and 8D, observers and modifiers may be employed to read and/or write data to and/or from a database by a SQ instance. Similarly, observers and modifiers may be employed to read and/or write data to and/or from a database by an agent.

FIG. 8E shows a flowchart in accordance with one or more embodiments of the invention. The method depicted in FIG. 8E may be used to generate observers in response to requests to read data from a database by an agent in accordance with one or more embodiments of the invention. One or more steps shown in FIG. 8E may be omitted, repeated, and/or performed in a different order among different embodiments.

In Step 840, a database may obtain one or more observer targets. The database may obtain the observer targets based on a request from an agent. The request may include one or more elements of the database.

In Step 842, the database may determine the location of the observer targets. The database may determine the location of the observer targets by requesting the location of each observer target from a database planner (210, FIG. 2).

In Step 844, the database may generate one or more observers based on the location of the observed targets. As described with respect to FIG. 8B, multiple observers and/or memory transport may be used to propagate information from the observed targets of the database to the agent that requests the targets be observed in Step 840.

FIG. 8F shows a flowchart in accordance with one or more embodiments of the invention. The method depicted in FIG. 8F may be used to generate modifiers in response to requests to write data to a database by an agent in accordance with one or more embodiments of the invention. One or more steps shown in FIG. 8F may be omitted, repeated, and/or performed in a different order among different embodiments.

In Step 850, a database may obtain one or more modifier targets. The database may obtain the modifier targets based on a request from an agent. The request may include one or more elements of the database.

In Step 842, the database may determine the location of the modifier targets. The database may determine the location of the modifier targets by requesting the location of each modifier target from a database planner (210, FIG. 2).

In Step 844, the database may generate one or more modifiers based on the location of the modifier targets.

Figure 9A:
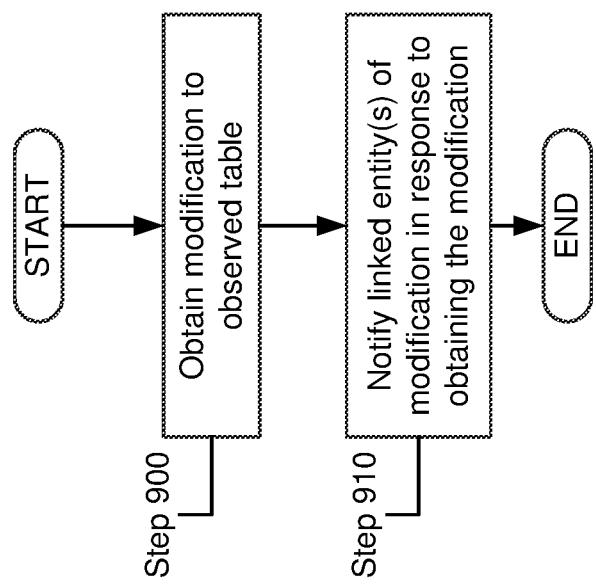
FIG. 9A shows a flowchart of a method of obtaining modifications to a table in accordance with one or more embodiments of the invention.

FIG. 9A shows a flowchart in accordance with one or more embodiments of the invention. The method depicted in FIG. 9A may be used by an observer to notify a linked entity of a change to an observed element of a database in accordance with one or more embodiments of the invention. One or more steps shown in FIG. 9A may be omitted, repeated, and/or performed in a different order among different embodiments.

In Step 900, an observer may obtain a modification to an observed table. As described with respect to FIG. 5, each element of each table may include a subscription list. When an element of a table of a database is modified, the database may notify each observer listed in the subscription list of the modification. The observer may obtain the modification by the notification of change provided by the database.

In one or more embodiments of the invention, the observer may periodically poll the database to determine whether an observed element of a table has been modified. The observer may determine whether the observed element of the table of the database has been modified based on the write history of the element. In other words, the observer may review the write history of the element since the element was last observed by the observer for modification. The observers may determine whether an observed element of a table has been modified using other methods without departing from the invention. For example, in one or more embodiments of the invention, the observer may be notified of the modification to the table rather than poll the database to determine whether the table has been modified.

In Step 910, the observer may notify any linked entities of the modifications obtained in Step 900. As described with respect to FIGS. 7 and 8A, an observer may be linked to one or more entities. The entities may be input tables of SQ instances, agents, or any other consumer of information. The observer may notify each linked entity of the modification of the element of the database the observer is observer is observing.

Figure 9B:
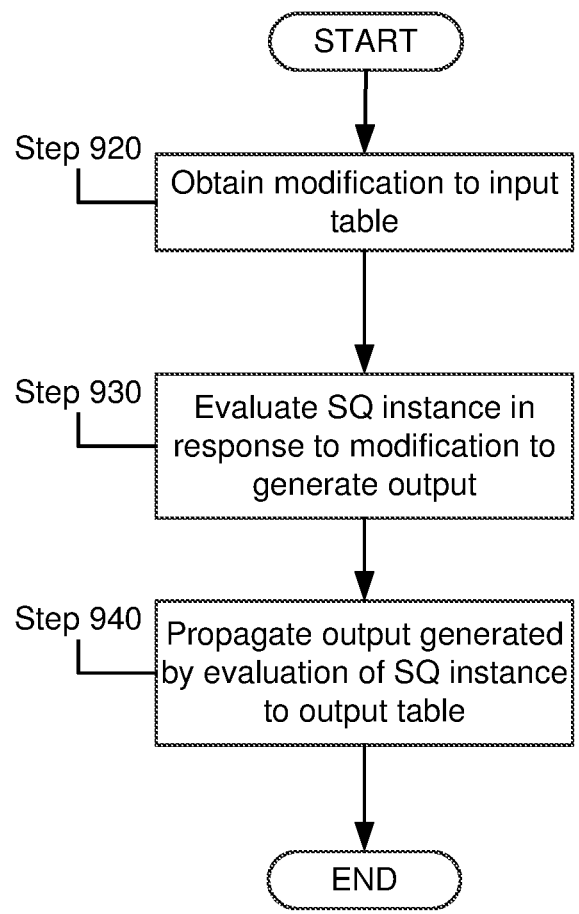
FIG. 9B shows a flowchart of a method of evaluating a SQ instance in accordance with one or more embodiments of the invention.

FIG. 9B shows a flowchart in accordance with one or more embodiments of the invention. The method depicted in FIG. 9B may be used by a SQ instance to evaluate a SQ in accordance with one or more embodiments of the invention. One or more steps shown in FIG. 9B may be omitted, repeated, and/or performed in a different order among different embodiments.

In Step 920, a SQ instance may obtain a modification to an input table. The modification may be obtained by an observer performing the method shown in FIG. 9A.

In Step 930, the SQ instance may execute the compiled query of the SQ in response to the modification. Executing the compiled query may generate output.

In Step 940, the SQ instance may propagate output generated by evaluation of the SQ instance to an output table. The output generated by the SQ instance may be propagated to an output table by the method shown in FIG. 9C.

Figure 9C:
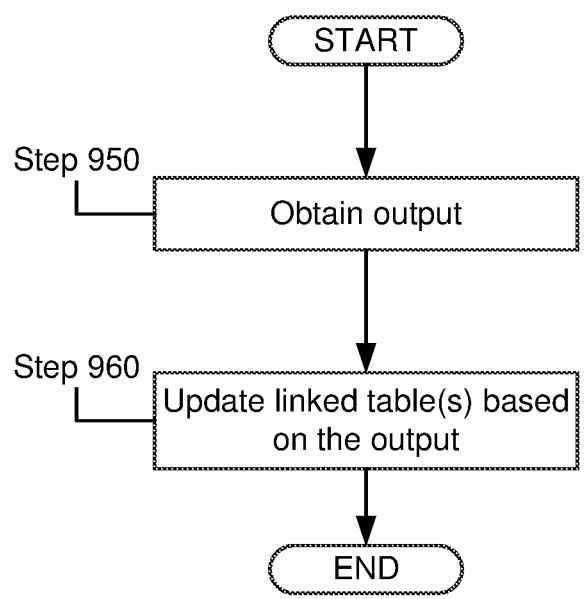
FIG. 9C shows a flowchart of a method of propagating output to a table in accordance with one or more embodiments of the invention.

FIG. 9C shows a flowchart in accordance with one or more embodiments of the invention. The method depicted in FIG. 9C may be used by a modifier to propagate output in accordance with one or more embodiments of the invention. One or more steps shown in FIG. 9C may be omitted, repeated, and/or performed in a different order among different embodiments.

In Step 950, a modifier may obtain an output. The modifier may obtain the output from a compiled query of a SQ instance, an agent, or any other entity.

In Step 960, the modifier updates one or more linked tables based on the obtained output.

Figure 10:
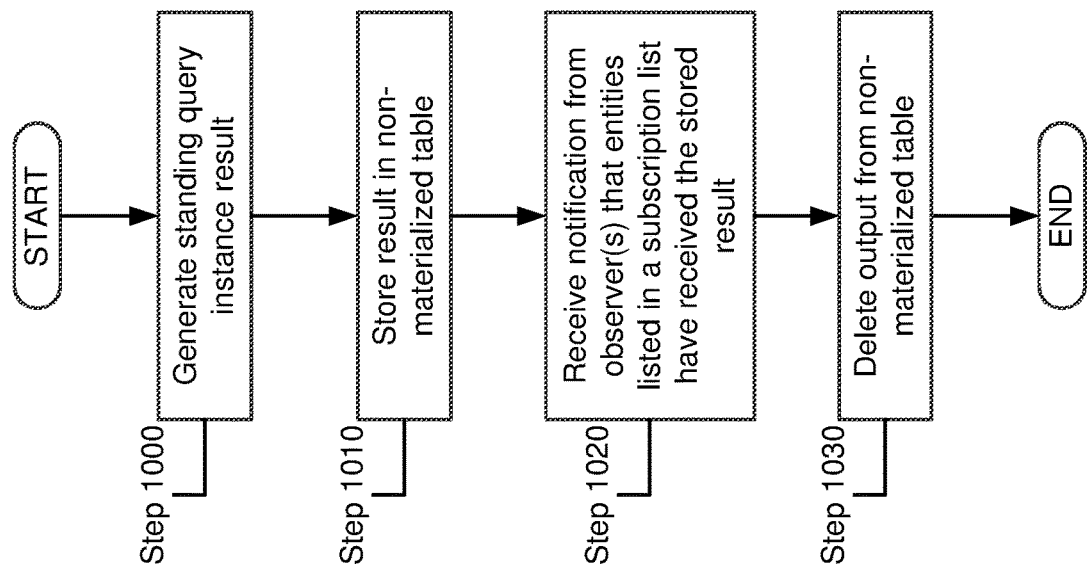
FIG. 10 shows a flowchart of a method of managing storage non-materialized table in accordance with one or more embodiments of the invention.

FIG. 10 shows a flowchart in accordance with one or more embodiments of the invention. The method depicted in FIG. 10 may be used by a network device to manage a non-materialized table in accordance with one or more embodiments of the invention. One or more steps shown in FIG. 10 may be omitted, repeated, and/or performed in a different order among different embodiments.

In Step 1000, a modifier of a SQ instance may obtain an output. The modifier may obtain the output from a compiled query of a SQ instance, an agent, or any other entity.

In Step 1010, the modifier may store the output in a non-materialized table of a database.

In Step 1020, the database may receive a notification from one or more observers that all entities listed in a subscription list of the non-materialized table have received the stored result.

In Step 1030, the database may delete the output from the non-materialized table. The database may release the temporary storage by deleting the stored result and/or storing other data in the temporary storage.

The following is a non-limiting explanatory example of a system. FIG. 11 shows a diagram of the system including a database (1100), two query instances (1170, 1171), and a consumer (1200).

The first query (1170) generates a materialized output that is stored in a table (1140) of the database (100). The first query (1170) generates the materialized output from data stored in elements of table 1 (1110) of the database (1100). A first observer (1180) notifies the first query instance (1170) of changes to the elements of table 1 (1110) on which the materialized output is based. A change in the values of the elements of table 1 (1110) triggers the first query instance (1170) to generate a materialized output.

When an output is generated by the first query instance (1170), it is propagated to materialized table (1140) by a first modifier (1190). The output is stored in the materialized table (1140).

The second query (1171) generates the non-materialized output from data stored in elements of the materialized table (1140) of the database (1100). A second observer (1181) notifies the second query instance (1171) of changes to the elements of the materialized table (140) on which the output of the second query instance (1171) is based. A change in the values of the elements of the materialized table (1140) triggers the second query instance (1171) to generate an output.

When an output is generated by the second query instance (1171), the output is propagated to a non-materialized table (1150) by a second modifier (1191). The output is stored in the non-materialized table (1150).

The chassis temperature of each of server #1, server #2, and server #3 (not shown) is being stored in Table 1 (1110) each minute on the minute. The first query instance selects the temperature of server #1 and outputs the temperature of server #1 which is being stored in the materialized table. The second query instance includes a compiled query that averages three measurements of server #1 and stores the average in the non-materialized table. The consumer is consuming the average temperature of server #1.

Figure 11A:
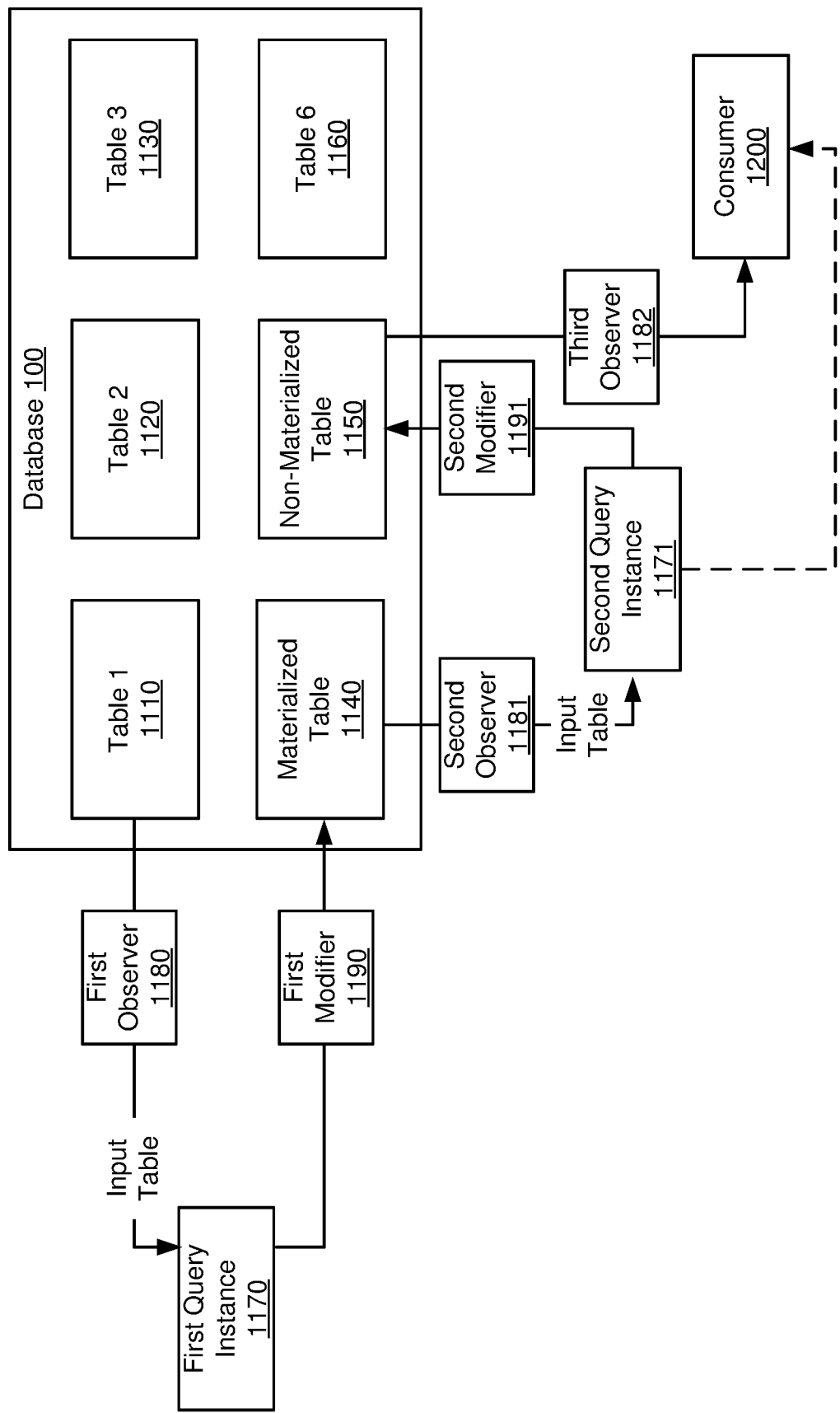
FIG. 11A shows a diagram of an example of a system.

FIG. 11B shows an example of the state of the materialized table (1140) and the non-materialized table (1150) at a time of 4 (once four measurements of the temperature of the chassis of server #1 have been stored in the materialized table). The first column of the materialized table indicates a time at which the temperature specified in the second column was stored to the materialized table. While illustrated as being written in sequential, descending rows in FIG. 11B for simplicity, the entries may be written to any row of the table, in any order, or randomly without departing from the invention. The write history associated with each entry of each table specifies a timing of the write and enables the write order of each entry to be determined. The write history of the materialized table and non-materialized table is not illustrated in FIG. 11B for simplicity.

The first query instance has selected the temperature of server #1 and output the temperature which is stored in the materialized table. The second query instance has consumed each of the measurements of Server #1's temperature at time 1, 2, and 3 as indicated by the write history location of the second query instance indicated by the arrow adjacent to the fourth row of the materialized table. The second query instance has also generated an output and stored the output to the non-materialized table. The consumer has not yet consumed the output stored the non-materialized table as indicated by the write history location adjacent to first row of the non-materialized table.

Figure 11C:
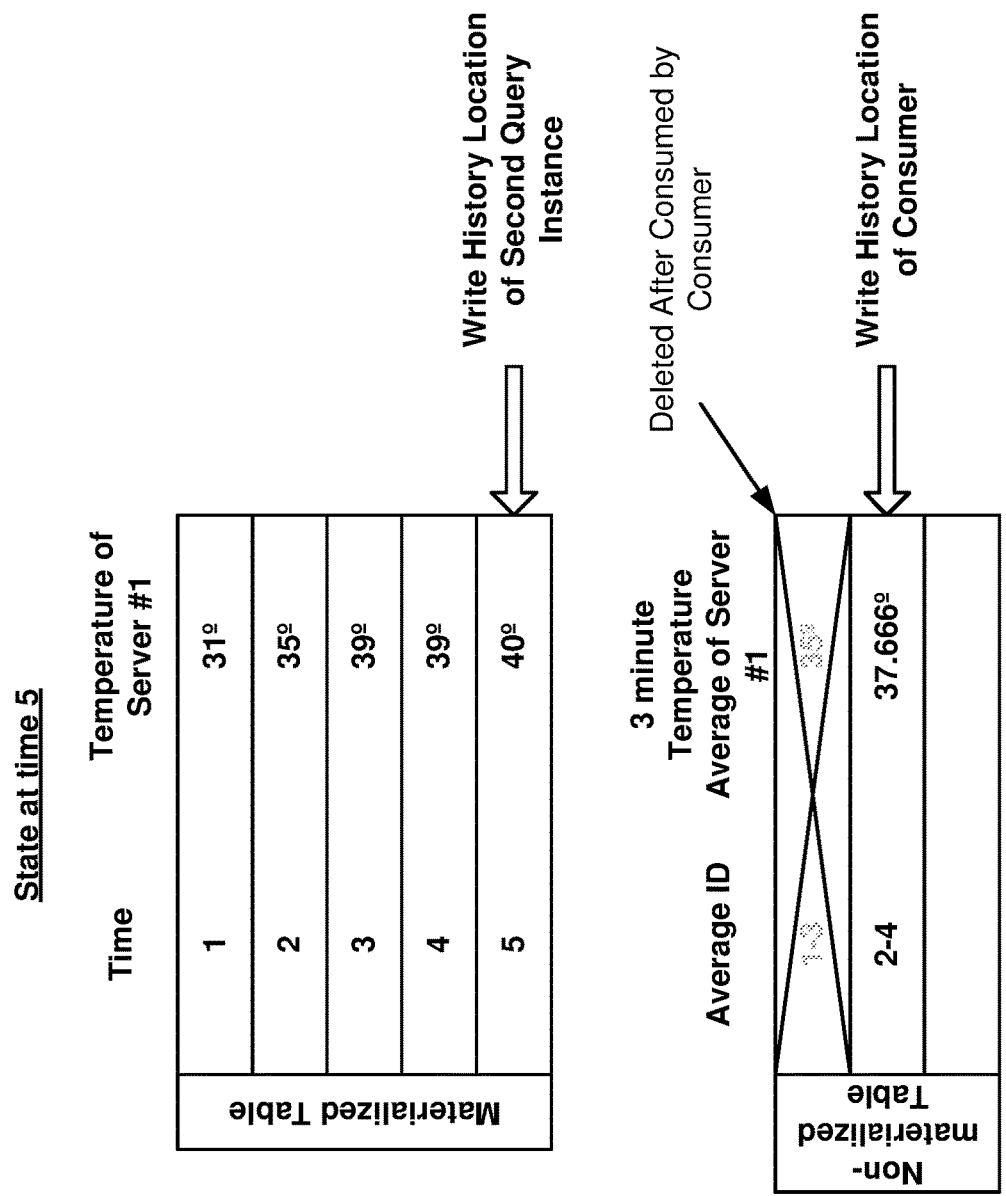
FIG. 11C shows a first diagram of a materialized table and a non-materialized table of the example at a second time of FIG. 11A.

FIG. 11C shows an example of a second state of the materialized table and non-materialized table at time 5. The first query instance has selected the temperature of server #1 at times 4 and 5 and output the temperature as indicated in the two additional rows of Table 4. The second query instance has consumed the measurements of Server #1's temperature at time 4 as indicated by the write history location of the second query instance adjacent to the fifth row but has not yet consumed the measurement at time 5. The consumer has consumed the first output stored in the non-materialized table. In response to the consumption of the output stored in the first row by all consumers, the database deleted the output stored in the first row of the non-materialized table.

Figure 11D:
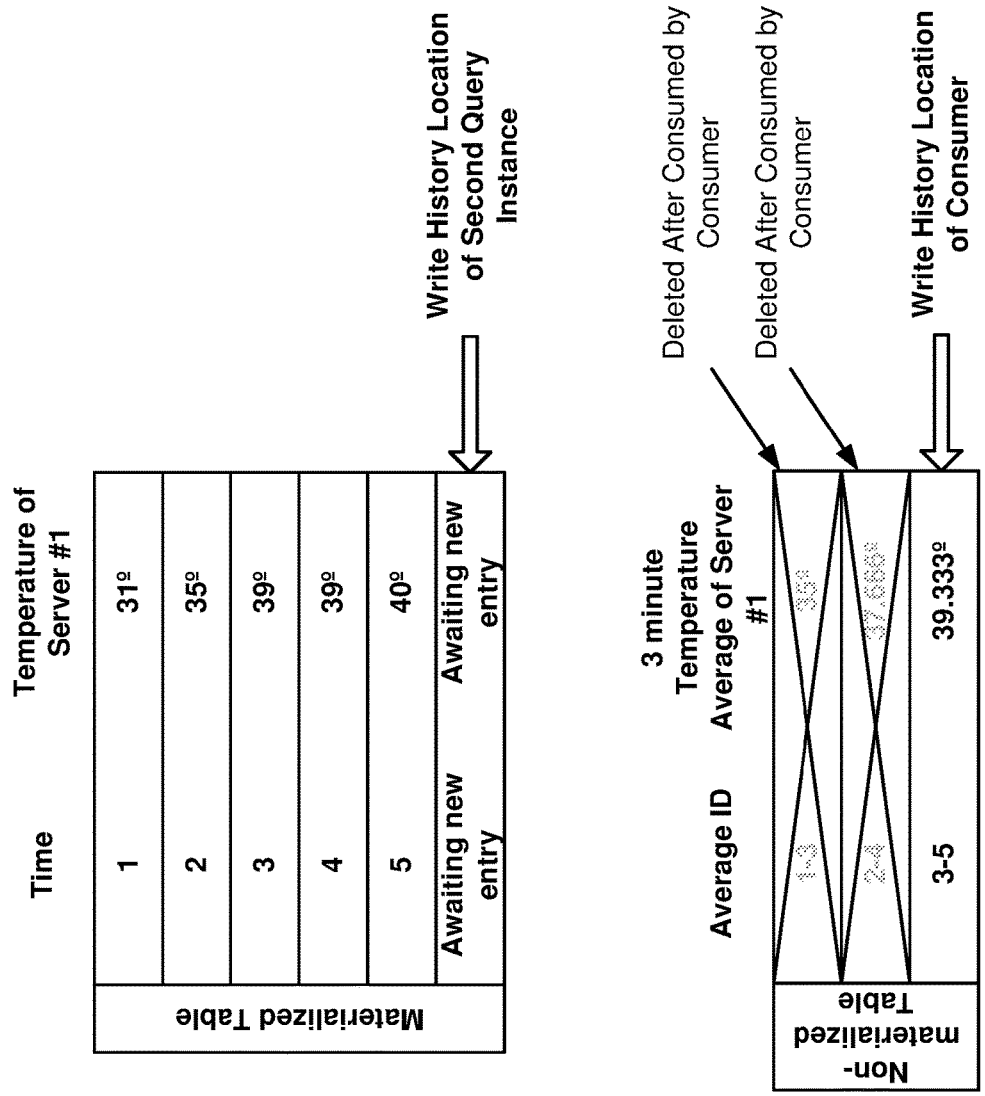
FIG. 11D shows a second diagram of a materialized table and a non-materialized table of the example at the second time of FIG. 11A.
Figure 11E:
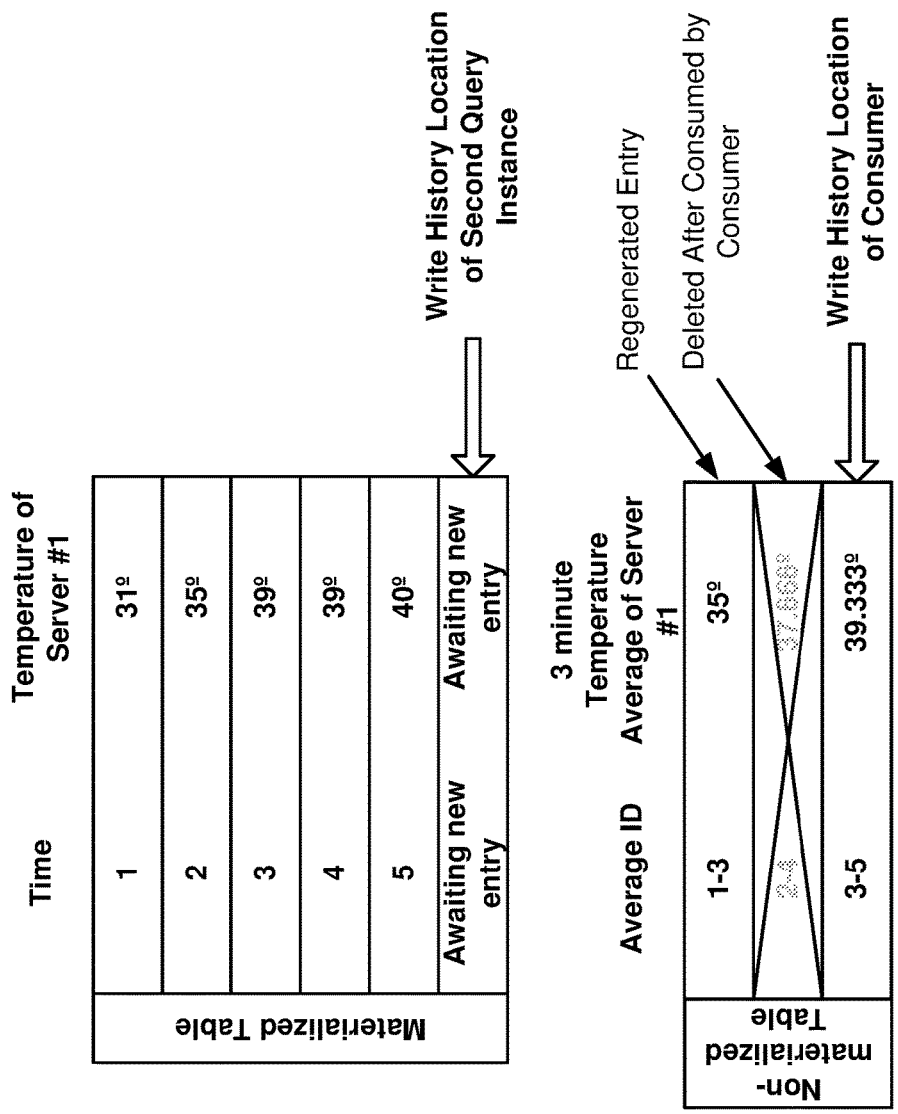
FIG. 11E shows a third diagram of a materialized table and a non-materialized table of the example at the second time of FIG. 11A.

FIG. 11D shows a continued example of the state of materialized table and non-materialized table at time 5. The second query instance has consumed the measurements of Server #1's temperature at time 5 as indicated by the write history location of the second query instance being located adjacent to the sixth row of the materialized table. The consumer has consumed the second output stored in the non-materialize table as indicated by the arrow adjacent to the third row of the non-materialized table. At this point in time, the consumer requests the first output stored in the non-materialized table, e.g., the three minute temperature average that was stored in the first row that has been deleted. However, the first output is no longer available because it was deleted after being consumed.

In response to the request for the output stored in the non-materialized table that has been deleted, the second query re-generates the first output by obtaining the entries of the materialized table on which the first output was based. In other words, the values of the temperature of server #1 stored in the first three rows of the materialized table. Once regenerated, the requested result of 35° is provided to the consumer. In this example, the result is provided to the consumer by storing the result in the non-materialized table via the second modifier and subsequent propagation of the result to the consumer by the second observer.

One or more embodiments of the invention may enable one or more of the following: i) storage of SQ results in a temporary storage, ii) determination of whether a SQ instance may be generated including a non-materialized output, iii) reduced memory use by storing output of SQ instances in temporary storage, and iv) improved database performance by reducing the total number of stored entries.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
a database comprising:
a materialized table comprising a value;
a non-materialized table comprising an output; and
a query instance programmed to generate the output that is stored in the non-materialized table using the value,
wherein the database is programmed to:
delete the output from the non-materialized table after it has been read by a consumer,
after the deletion, obtain a request for the output,
determine, in response to the request, that the output is not present in the non-materialized table,
in response to the determining, initiating regeneration of the output using at least the value in the materialized table to obtain a regenerated output, and
provide the regenerated output in response to the request.

2. The network device of claim 1, wherein regenerating the output comprises sending a request to the query instance to regenerate the output.

3. The network device of claim 2, wherein the request specifies an entry of the materialized table.

4. The network device of claim 3, wherein the request further specifies an entry of a second non-materialized table.

5. The network device of claim 1, wherein providing the regenerated output comprises storing the regenerated output in the non-materialized table.

6. The network device of claim 1, wherein the network device is one selected from a group consisting of a router, a switch, and a multilevel switch.

7. A method of operating a network device, comprising:
deleting an output from a non-materialized table in a database in the network switch after it has been read by a consumer;
after the deleting, obtaining a request for the output; and
in response to the request:
determining that the output is not present in the non-materialized table,
in response to the determining, initiating regeneration of the output using at least a value in a materialized table in the database to obtain a regenerated output; and
providing the regenerated output in response to the request.

8. The method of claim 7, wherein regenerating the output comprises sending a request to a query instance that generated the output to regenerate the output, wherein the query instance is executing on the network device.

9. The method of claim 8, wherein the request specifies an entry of the materialized table, wherein the entry comprises at least the value.

10. The method of claim 9, wherein the request further specifies an entry of a second non-materialized table in the database.

11. The method of claim 7, wherein providing the regenerated output comprises storing the regenerated output in the non-materialized table.

12. The method of claim 11, wherein providing the regenerated output further comprises propagating the regenerated output by an observer executing on the network device.

13. The method of claim 7, wherein the regenerated output is stored in the non-materialized table by a modifier executing on the network device.

14. A non-transitory computer readable medium (CRM) storing instructions, the instructions when executed by a network device cause the network device to:
deleting an output from a non-materialized table in a database in a network device after it has been read by a consumer;
after the deleting, obtain a request for the output; and
in response to the request:
determining that the output is not present in the non-materialized table,
in response to the determining, initiating regeneration of the output using at least a value in a materialized table in the database to obtain a regenerated output; and
providing the regenerated output in response to the request.

15. The non-transitory CRM of claim 14, wherein regenerating the output comprises sending a request to a query instance that generated the output to regenerate the output.

16. The non-transitory CRM of claim 15, wherein the request specifies an entry of the materialized table, wherein the entry comprises at least the value.

17. The non-transitory CRM of claim 16, wherein the request further specifies an entry of a second non-materialized table in the database.

* * * * *